(12) United States Patent
Kanai et al.

(10) Patent No.: US 7,814,325 B2
(45) Date of Patent: Oct. 12, 2010

(54) SYSTEM, METHOD AND COMPUTER READABLE MEDIUM FOR CERTIFYING RELEASE OF ELECTRONIC INFORMATION ON AN INTERNET

(75) Inventors: Yoichi Kanai, Yokohama (JP); Masuyoshi Yachida, Yokohama (JP); Tomio Mizuno, Yamato (JP); Tatsuya Furukawa, Yokohama (JP); Yoichi Ishikawa, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 895 days.

(21) Appl. No.: 11/562,264

(22) Filed: Nov. 21, 2006

(65) Prior Publication Data
US 2007/0143620 A1    Jun. 21, 2007

Related U.S. Application Data

(63) Continuation of application No. 09/725,515, filed on Nov. 30, 2000, now Pat. No. 7,143,144.

(30) Foreign Application Priority Data
Nov. 30, 1999   (JP)   ................... 11-341288
Nov. 30, 1999   (JP)   ................... 11-341289

(51) Int. Cl.
   *H04L 9/00*   (2006.01)
(52) U.S. Cl. .................... 713/176; 709/217
(58) Field of Classification Search .......... 713/156, 713/176, 170; 707/10, 204; 726/2, 9
See application file for complete search history.

(56) References Cited

U.S. PATENT DOCUMENTS 5,164,988 A    11/1992   Matyas et al.
5,265,164 A    11/1993   Matyas et al.
5,579,393 A *  11/1996   Conner et al. ............... 713/176

(Continued)

FOREIGN PATENT DOCUMENTS

JP      9-185633       7/1997

(Continued)

OTHER PUBLICATIONS nhse_ac_legal_report_1997.PDF; www.nhse.org/nhse_ac_legal_report_1997.pdf.

(Continued)

*Primary Examiner*—Thong H Vu
(74) *Attorney, Agent, or Firm*—Oblon, Spivak, McClelland, Maier & Neustadt, L.L.P.

(57) ABSTRACT

A method of certifying the existence of electronic information released on a network at a time and date. The network connects one or more computer servers and a plurality of client computers with each other. Electronic information of a web page stored in one of the plurality of client computers is accessed using information of its location from one of the computer servers based on a request from one of the client computers. A copy of the electronic information is then obtained. Attribute information is generated from the location, access time, and date when the electronic information is accessed. An electronic certificate may be generated by uniquely specifying the electronic information and the attribute information as inherent information identifying the electronic information. The copy of the electronic information is stored in a memory by tying up the electronic information with the electronic certificate and the attribute information. At least the electronic certificate, the attribute information, and preferably the copy of the electronic information can also be read and provided from the memory to the one of the client computers or its operator as a requester.

12 Claims, 16 Drawing Sheets

U.S. PATENT DOCUMENTS

| | | | |
|---|---|---|---|
| 5,659,616 A * | 8/1997 | Sudia | 705/76 |
| 5,724,575 A * | 3/1998 | Hoover et al. | 707/10 |
| 5,765,149 A * | 6/1998 | Burrows | 1/1 |
| 5,781,629 A | 7/1998 | Haber et al. | |
| 5,813,009 A * | 9/1998 | Johnson et al. | 707/100 |
| 5,819,029 A | 10/1998 | Edwards et al. | |
| 5,828,751 A | 10/1998 | Walker et al. | |
| 5,903,882 A | 5/1999 | Asay et al. | |
| 5,909,673 A | 6/1999 | Gregory | |
| 5,931,917 A | 8/1999 | Nguyen et al. | |
| 5,978,840 A | 11/1999 | Nguyen et al. | |
| 6,044,398 A | 3/2000 | Marullo et al. | |
| 6,058,484 A | 5/2000 | Chapman et al. | |
| 6,072,874 A | 6/2000 | Shin et al. | |
| 6,081,899 A * | 6/2000 | Byrd | 726/2 |
| 6,088,707 A | 7/2000 | Bates et al. | |
| 6,105,008 A | 8/2000 | Davis et al. | |
| 6,135,646 A * | 10/2000 | Kahn et al. | 709/217 |
| 6,188,766 B1 | 2/2001 | Kocher | |
| 6,192,131 B1 | 2/2001 | Geer et al. | |
| 6,226,618 B1 | 5/2001 | Downs et al. | |
| 6,233,565 B1 | 5/2001 | Lewis et al. | |
| 6,249,873 B1 | 6/2001 | Richard et al. | |
| 6,266,772 B1 | 7/2001 | Suzuki | |
| 6,285,991 B1 | 9/2001 | Powar | |
| 6,347,373 B1 | 2/2002 | Hoepman et al. | |
| 6,367,012 B1 | 4/2002 | Atkinson et al. | |
| 6,377,810 B1 | 4/2002 | Geiger et al. | |
| 6,393,477 B1 | 5/2002 | Paxhia et al. | |
| 6,397,259 B1 | 5/2002 | Lincke et al. | |
| 6,397,261 B1 * | 5/2002 | Eldridge et al. | 713/171 |
| 6,424,966 B1 | 7/2002 | Meyerzon et al. | |
| 6,431,985 B1 | 8/2002 | Kim | |
| 6,442,696 B1 | 8/2002 | Wray et al. | |
| 6,459,359 B1 | 10/2002 | Miyashita | |
| 6,487,584 B1 * | 11/2002 | Bunney | 709/206 |
| 6,510,513 B1 * | 1/2003 | Danieli | 713/156 |
| 6,532,542 B1 | 3/2003 | Thomlinson et al. | |
| 6,546,404 B1 * | 4/2003 | Davis et al. | 707/204 |
| 6,557,009 B1 | 4/2003 | Singer et al. | |
| 6,584,565 B1 | 6/2003 | Zamek | |
| 6,609,198 B1 | 8/2003 | Wood et al. | |
| 6,622,247 B1 | 9/2003 | Isaak | |
| 6,638,314 B1 | 10/2003 | Meyerzon et al. | |
| 6,658,400 B2 | 12/2003 | Perell et al. | |
| 6,658,568 B1 | 12/2003 | Ginter et al. | |
| 6,675,153 B1 | 1/2004 | Cook et al. | |
| 6,684,336 B1 * | 1/2004 | Banks et al. | 709/227 |
| 6,697,103 B1 * | 2/2004 | Fernandez et al. | 348/143 |
| 6,738,907 B1 * | 5/2004 | Carter | 726/9 |
| 6,745,327 B1 * | 6/2004 | Messing | 713/170 |
| 6,898,709 B1 | 5/2005 | Teppler | |
| 7,107,454 B2 * | 9/2006 | Mori et al. | 713/180 |
| 2001/0011255 A1 | 8/2001 | Asay et al. | |
| 2002/0023026 A1 | 2/2002 | Carroll et al. | |
| 2004/0073513 A1 | 4/2004 | Stefik et al. | |
| 2004/0111379 A1 | 6/2004 | Hicks et al. | |
| 2004/0123129 A1 | 6/2004 | Ginter et al. | |
| 2005/0114653 A1 | 5/2005 | Sudia | |
| 2005/0144437 A1 | 6/2005 | Ransom et al. | |

FOREIGN PATENT DOCUMENTS

| | | |
|---|---|---|
| JP | 11-39395 | 2/1999 |

OTHER PUBLICATIONS

Performance evaluation of public-key certificate revocation system with balanced hash tree; Parallel Processing, 1999, Proceedings, 1999 International Workshops on, Sep. 21-24, 1999.

3 ID-based cryptographic schemes using a non-interactive public-key distribution system Yuh-Min Tseng; Jinn-Ke Jan; IEEE Proceedings., 14$^{th}$ Annual, Dec. 7-11, 1998.

Privacy Enhancement for Internet Electronic Mail: Part II..—Kent (1993); ftp.cert.dfn.de/pub/tools/crypt/secude/Security/pem/rfc1422.ps.

Strongboxes for Electronic Commerce—Hardjono, Seberry (1996); www.sage.usenix.org/publications/library/proceedings/ec96/full_papers/hardjono/hardjono.ps.

Authentication of Mobile Users—Refik Molva (1994) ftp.eurecom.fr/ATM/papers EURECOM/PAPERS/mobusers.ps.gz.

MISPC Minimum Interoperability Specification for PKI..—Burr, Dodson, Nazario, .. (1997) csrc.ncsl.nist.gov/pki/mispc.ps.

Exploiting Dynamic Aspects of Visual Perception for..—Milanese, Pun, Gil, Bost (1994) cui.unige.ch/pub/vision/papers/milanese/94.09.perac94.ps.Z.

The Resurrecting Duckling: Security Issues for Ad-hoc..—Stajano, Anderson (1999) www.cl.cam.ac.uk/~fms27/duckling/../papers/duckling-attss99.ps.gz.

* cited by examiner

SYSTEM, METHOD AND COMPUTER READABLE MEDIUM FOR CERTIFYING RELEASE OF ELECTRONIC INFORMATION ON AN INTERNET

CROSS-REFERENCE TO RELATED APPLICATIONS

This document is a continuation of U.S. application Ser. No. 09/725,515 filed on Nov. 30, 2000, and claims priority under 35 USC §119 to Japanese Patent Application Nos. 11-341288 and 11-341289 filed on Nov. 30, 1999, the entire contents of each of which are hereby incorporated herein by reference.

BACKGROUND OF THE INVENTION

1. Field of the Invention

The present invention generally relates to a certifying system, method, program, and computer readable medium which certifies the existence of prescribed electronic information, and in particular relates to a system, method, program, and a computer readable medium which is capable of certifying the release of prescribed electronic information on a network.

2. Discussion of the Background

A method and system for certifying the existence of electronic information on a specified date are described, for example, in U.S. Pat. Nos. 5,136,647, 5,136,646, 5,373,561, and 5,781,629, and U.S. Reissued Pat. No. 34,954.

However, such a technology does not certify the release of specified electronic information on an Internet or the like.

Further, recently technical information is increasingly being disclosed on the Internet or the like, which technical information includes contents similar to those released in a form of a magazine or a book. Moreover, such communication on the Internet may be more prompt than a conventional publication. Thus, investigators also increasingly utilize the Internet or the like to promptly publish his or her investigation results.

Further, since the transmission of information via the Internet is easy and not costly when compared with a conventional publication, a lot of information is being released on the Internet or the like. Even if the conventional technology can certify the existence of electronic information, it can not certify the release of electronic information on the Internet or the like. In such a case, i.e., if the release of a prescribed fact on an Internet or the like is not certified, a patent can possibly be obtained by another person even if its contents are the same as in information released on the Internet.

In addition, technical information released on the Internet or the like has substantially the same effect as a publication. As a result, a clause has been newly established in the Japanese Patent Law that an invention available to the public through an electronic communication line before filing cannot be patented. However, it is difficult to certify a prescribed fact such as when technical information has been released on the Internet or the like, and whether the released technical information has been changed. Thus, there generally is a drawback of less reliability of certifying such a fact on the Internet than certifying such a fact in a conventional publication.

On the other hand, a document utilized such as on the Internet is generally made such as by a hypertext markup language (hereinafter referred to as an HTML), and generally includes a variety of objets that occasionally are embedded inline therein. In these objects, some objects that occasionally require a Plug-in software for Browser use and/or an accessory application and any of one a static image, an animation, a sound, and a Java(™ of Sun Microsystems Corporation) Applet may be included. A document generated such as by the HTML with embedded objects generally constitute, in combination, electronic information released such as on the Internet to the public.

Further, a hyperlink occasionally is connected to a document generated such as by an HTML. An object is occasionally provided including a document generated such as by an HTM to be referred to as an external resource. However, the electronic information released such as on the Internet is generally constructed by supposing that the electronic information is inspected in an online manner. Therefore, if the electronic information is locally preserved (i.e., stored in a storing device of a PC), an objet either embedded or referred to occasionally is not available from the electronic information because the hyperlink is disconnected. As a result, it can not be noted and accordingly not certified after the end of the release on the network (i.e., Internet) what electronic information was released on the network.

SUMMARY OF THE INVENTION

The present invention has been made in view of the above noted and other problems, and one object of the present invention is to address and resolve such problems.

A further object of the present invention is to provide a novel method of certifying at least the existence of electronic information released on a network at a prescribed time and date that connects one or more computer servers and a plurality of client computers with each other.

The method may include the steps of: accessing electronic information of a web page stored in a prescribed one of a plurality of client computers using information of its location from one of the computer servers based on a request from one of the client computers; obtaining a copy of the electronic information; generating attribute information from at least the location, time, and date when the step of accessing the electronic information is executed; generating a electronic certificate by uniquely specifying the electronic information and the attribute information; obtaining the electronic certificate; storing the copy of the electronic information in a memory by tying up with the electronic certificate and the attribute information; and, reading and providing at least the electronic certificate and the attribute information, and preferably the copy of the electronic information, from the memory to the one of the client computers or its operator.

In another embodiment, the method may further include the steps of: periodically accessing the electronic information; generating and obtaining the electronic certificates each time the access is periodically executed; storing all of the copies of the electronic information by tying up with a corresponding electronic certificate and attribute information in a memory; and, providing all of the electronic information together with the corresponding electronic certificate and attribute information to the one of client computers or its operator.

In yet another embodiment, the unique specification for the electronic certificate is executed by using a hash value calculated from both of the electronic information and its attribute information in a prescribed manner, obtaining another hash value from the former hash vale in a prescribed manner, and after that assigning the calculation result to the electronic certificate as an inherent information thereof, so that if the electronic information or the attribute information is falsified it can be noted from a change in the hash value of the falsified electronic information and the attribute information.

In yet another embodiment, the step of accessing the electronic information may be executed from another computer server to represent that the electronic information is not limited to a specific computer server to access.

In yet another embodiment, the step of accessing the electronic information is executed at an interval to collect all of changes in a web page.

In yet another embodiment, the method may further include the steps of: displaying one or more links representing locations of the electronic information, respectively; and allowing the public to access the electronic information using an applicable link via one of the computers so that it is represented that the electronic information is accessible and employable as evidence.

In yet another embodiment, the method may further include the steps of: detecting a change in the contents of the electronic information; and storing the change in the memory in addition to the electronic information initially stored if the change is detected.

In yet another embodiment, the method may further include the steps of: generating a database in one of the computers other than the one of the computer servers from one or more electronic information stored in the memory; and allowing public to retrieve the electronic information via the one of the computers other than the one of the computer servers so that it is represented that the electronic information is accessible and employable as evidence.

In yet another embodiment, the method may further include the steps of: generating one or more abstracts of the electronic information stored in the memory; generating a database in one of the computers other than one of the server computers of the one or more abstracts; and, allowing the public to retrieve an abstract via the one of the computers other than one of the server computers.

In yet another embodiment, the method may further include the step of storing information which indicates the availability of retrieval of the electronic information via the network, in a memory when the electronic information can be retrieved via one of the computers so that it is represented that the electronic information is accessible and employable as evidence.

In yet another embodiment, the attribute information may further include at least any one of an electronic information displaying period of time, the access source IP address, and a number of access times so that the electronic information can be objective when used as evidence.

In yet another embodiment, the method may further include the steps of: detecting if an object is included in the electronic information when the electronic information is locally preserved in a one of the client computers; and changing contents of a copy of the electronic information by describing a reference into the copy of the electronic information so that the object can be viewed in the one of the client computers.

In yet another embodiment, the electronic certificate and/or the electronic information may be provided with a read only medium.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
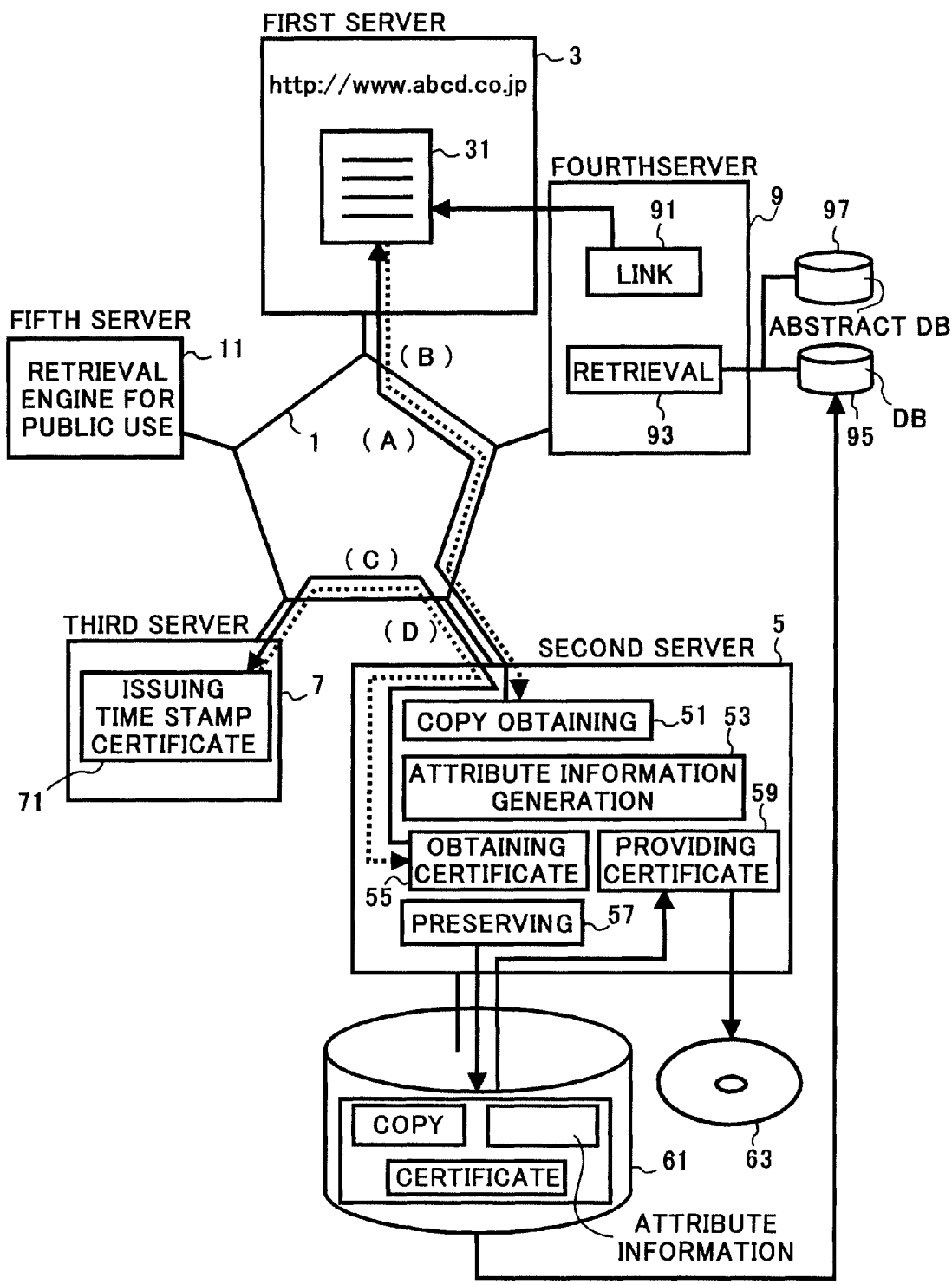
FIG. 1 is a block chart illustrating a perspective view of an overall system according to the present invention.

Referring now to the drawings, wherein like reference numerals and marks designate identical or corresponding parts throughout the several figures.

Initially, several services provided by the present invention is now summarily described. A requester may request, as a first type of service, a service provider for recordation of a prescribed web page of his or her own world wide web (hereinafter referred to as a WWW) site that is connected to an Internet, so that both that existence and the location of the prescribed web page can be known to the public as a prior-art.

A requester may request, as a second type of service, a service provider to display link information on a prescribed web page of the service provider for the same purpose as noted above.

During the first service, the service provider may access and copy a prescribed web page having a prescribed URL designated by the requester from a prescribed Internet protocol (hereinafter referred to as an IP) address, which is assigned to each of personal computers, at an optional timing. Such a prescribed IP address and optional timing may be unknown to the requester so that the web page can be prior art which any third person can access. Subsequently, the service provider may generate an attribute information from the prescribed URL of the prescribed web page and the prescribed IP address as an access source. The service provider may then obtain a prescribed electronic certificate that uniquely specifies the copy of the web page and its attribute information including time and date data.

The service provider may then tie up and preserve the copy of the web page and its attribute information with the prescribed electronic certificate.

Further, the service provider may access again the prescribed web page of the prescribed URL from another IP address at another optional timing that is also unknown to the requester and copy the web page. Thus, the service provider can substantially obtain evidence for certifying that the prescribed WWW server displaying the prescribed web page does not limit access to the requester. Subsequently, the service provider generates the attribute information in the same manner as noted above and obtains a prescribed electronic certificate which uniquely specifies the copy of the web page and its attribute information with time and date data. The service provider may then tie up the copy of the web page and its attribute information with the electronic certificate, and then preserve them. The service provider repeats such processes during a prescribed time period designated by the requester.

Further, when the above-noted second service is requested, the service provider may display information of a link to the prescribed URL of the web page designated by the requester on his or her own web page of a WWW server connected to the Internet to allow the public access to the prescribed home page using the link information. For example, a link can be retrieved by the public per a requester or a field of contents. The link displayed on the WWW server may also be recorded and preserved along with its displaying time period or the like.

Thus, the requester can request the service provider for contents of the recorded web page designated as described in the above either simultaneously when the above-noted service is requested or when it is practically needed. In response to this request, the service provider may provide a copy of the web page, the attribute information, and the electronic certificate.

After that, the above-described data can be written into a CD-R or similar memory and then be provided to the requester. The copy of the web page, the attribute information, and the electronic certificate can otherwise be provided to the requester via the Internet.

Further, the second type of service may provide the requester with the fact that the link to the designated web page is displayed on the WWW server of the service provider, and the displaying time period or the like of the designated web page on the WWW server in a certificate form. The requester can utilize the information received from the service provider as evidence for certifying that his or her own web page is open (i.e., accessible to the public) on the Internet during the certain period of time.

Beside the first and second types of services, a requester can request a third type of service of recordation of a fact that a retrieval engine for public use connected to an Internet can retrieve a prescribed web page designated by the requester. Such a fact may certify both the existence and the location of the prescribed web page as is more readily noticeable for the public. In such a case, the service provider may retrieve the prescribed web page designated by the requester using an appropriate keyword or the like through a retrieval engine.

The retrieval engine may optionally be utilized to certify that not only can the prescribed retrieval engine retrieve the web page, but also that any kind of retrieval engine can do so. In other words, to certify that the web page can be accessible and its contents can publicly be known. When the designated web page can be retrieved, the fact that the designated web page can be retrieved, an address and a name of the retrieval engine, the keyword, and the retrieval time and date or the like may be recorded. These records can be provided to the requester as a certificate responsive to its request for recorded contents.

The requester can, of course, request the service provider to record a web page stored in a WWW server of another person when the web page is supposed to be a prior art. In such a case, the service provider may execute the similar operations as described with reference to the first type of service.

However, there is no guarantee that the web page of the third person's WWW server is continuously maintained during a certain period of time that is designated by the requester as web pages occasionally disappear or are modified. If the web page disappears, the service provider may record a time period during when the web page was open on the Internet. In addition, the service provider may provide the requester with information of the time period in addition to information ordinarily provided (i.e., the copy of the web page) in response to a request for recorded contents.

If the web page is modified and the above-described operation is executed in a similar manner, a modified career may remain. The web page stored in the WWW server of the other person can be designated by the requester using a URL of the web page. Otherwise, one or more web pages can be designated by one or more URLs obtained by keyword retrieval through a retrieval engine.

Further, a requester can request a service provider for a fourth type of service of recordation of a transition of a web page version stored in his or her own or another person's WWW server. The service provider may then execute substantially the same operations as described with reference to the first type of service.

However, the service provider may examine whether contents of the web page appearing at a current access are different from those of the web page appearing at a previous access using a prescribed device. If those are different from one another, the fact that the current web page is different from the previous one may be recorded. In this case, the service provider may not be required to preserve a copy of the web page because the requester preferably preserves the same at its personal computer.

If the service provider does not preserve the copy of the web page, objectives to be preserved by the service provider at each access made in both of the first service and its modified type of services may be only the attribute information and the electronic certificate. A change in the version can be recorded as follows. When both of the current and the previous accesses are made and both of the contents of the home page are different from each other, only a change in the version of the web page can be preserved.

Otherwise, the entire web page fully changed may be preserved only when a change exists in both of the contents. Further, when recordation is requested in both of the first service and its modified type of services, a recording time period, a number of recording times, a recording frequency, or the like, may be designated by the requester. The service provider may execute prescribed recordation in accordance therewith. Further, the second service to the fourth service type can be optional; in particular, the services of both of the third and fourth types of requests may not be required if the existence of the web page and its location have already been known to the public.

On the other hand, while the service provider continues any one of such services, the service provider may unavoidably hold a great number of web pages respectively attaching an electronic certificate that certifies the fact that an applicable web page is open on the Internet. Then, that information may be utilized so that the service provider can perform a prescribed service of providing any person with a web page attaching an electronic certificate as a fifth type of service. For example, the service provider may construct a prescribed database that allows keyword retrieval or the like via an Internet, and provide a third person with a prescribed retrieval service.

Specifically, the service provider may provide contents of a record with a medium such as a CD-R or via the Internet in response to a request of a retrieval for providing recorded contents retrieved. As a modification, an abstract of the web page attaching an electronic certificate may be generated and a database may be constructed in a prescribed form so that screening of the retrieval can be performed using the abstract.

A construction of a certifying system utilized in the above-described services for certifying release of an electronic information is now described referring to FIG. 1.

A first server 3, a second server 5, a third server 7, a fourth server 9, a fifth server 11, and a plurality of computers may be provided to be connected to a network 1 including, for example, an Internet. The first server 3 may include a WWW server that stores an electronic information such as a web page 31 whose URL is, for example, http://www.abcd.co.jp, and which is open on the network 1.

The second server 5 may be supervised by a service provider and may access electronic information designated by a requester and execute the following various functions. Namely, the second server 5 may include a copy obtaining function 51 of accessing electronic information designated by the requester and obtaining a copy thereof. The second server 5 may also include an attribute information generating function 53 of generating attribute information associated with the location of electronic information such as a URL and an access condition. The second server 5 may also include a certificate obtaining function 55 of obtaining an electronic certificate that uniquely specifies both of a copy of electronic information and its applicable attribute information with time and date data.

The second server 5 may also include a preservation function 57 of preserving prescribed necessary information responsive to a request from a requester, and a certificate providing function 59 of providing an electronic certificate or the like to the requester. A memory 61 described later in detail may be connected to the second server 5.

The third server 7 may include a time stamp certificate issuing function 71 of issuing a certificate which uniquely identifies and certifies prescribed electronic information with time and date data based on a request from the second server 5. The third server 7 may receive a certificate issuing request via the network 1 from the second server 5, issue the electronic certificate using the time stamp certificate issuing function 71, and then return the same to the request source (i.e., the second server 5).

The fourth server 9 may include a prescribed function to assist the second server 5, so that it may display one or more information of a link 91 to a prescribed web page, for example of a WWW server, designated by a requester.

However, a database of such information of the link 91 can be provided to be retrieved per contents or an owner of a linking destination web page or the like. Further, a database 95 may be provided using data stored in the memory 61. The fourth server 9 may include a retrieving function 93 of retrieving the database 95 via the network 1. Further, a database 97 may be provided to include a plurality of abstracts of electronic information generated from data stored in the memory 61. The retrieval function 93 may retrieve the database 97 via the network 1.

The fifth server 11 may be provided to be used by the public as a retrieval engine. Since construction of the fifth server 11 may substantially be the same as that of a conventional retrieval engine, a thorough description thereof is omitted.

A plurality of services provided responsive to the first type and its modified services in accordance with the present invention is now described with reference to an operation of the system illustrated in FIG. 1.

The requester may designate a prescribed web page having a prescribed URL, such as http://www.abcd.co.jp, as electronic information, and request the service provider for the above-noted first type of service and its modified services.

The service provider may execute prescribed operations using the second server 5. Specifically, the copy obtaining function 51 may access the prescribed web page of the URL (i.e., http://www.abcd.co.jp) of the first server at an optional timing via the route A, and obtain a copy of the web page 31 via the route B shown by a dotted line. The copy may be stored, for example, in a main memory (not shown) provided in the second server 5. The copy obtaining function 51 may also store an IP address of an accessing source (i.e., any one of servers belonging to the service provider) in the main memory every time an access is made. The copy obtaining function 51 may include a function of determining a plurality of address conditions used when an access is made, for example determining a prescribed access timing among periods of time designated by a requester and a prescribed IP address of an accessing source.

When the requester designates a prescribed access frequency, the copy obtaining function 51 may execute scheduling of an access to meet the designated access frequency. The attribute information generating function 53 may generate attribute information including the URL designated by the requester and the IP address of the accessing source. The attribute information can include an IP address assigned to a proxy server (not shown) and an access time and date when the second server 5 is connected to the network 1 via the proxy server.

The certificate obtaining function 55 may obtain an electronic certificate with regard to the copy of the web page obtained and the attribute information generated. In the system of FIG. 1, the certificate obtaining function 55 may generate and transmit a request for issuance of an electronic certificate via the route C to be received by the time stamp certificate issuing function 71 of the third server 7. The certificate obtaining function 55 may receive the electronic certificate from the time stamp certificate issuing function 71, for example, via the route D. The time stamp certificate issuing function 71 is described later in further detail. The preservation function 57 may preserve the copy of the web page 31, the attribute information, and the electronic certificate in the memory 61.

However, the preservation of the copy of the web page 31 may be optional because the requester may preserve the same by himself or herself. The preservation function 57 may determine that a copy of a web page currently obtained should not be preserved if the web page has substantially the same contents with those of a web page previously obtained.

Moreover, the preservation function 57 may preserve data of the copy of the web page or the like per a requester and/or a designated URL so that the certificate providing function 59 will readily take out necessary data. A requester may request for recorded contents simultaneously when a recording request is made or at an optional timing. As a result, the certificate providing function 59 may read the copy of an objective web page 31, its attribute information, and the applicable electronic certificate from the memory 61 responsive to the request. The certificate providing function 59 may then store those information in a storage medium 63 such as a CD-R and provide it to the requester.

As one example, the certificate providing function 59 may store, in the storage medium 63, all of the copy of the web page 31, the attribute information, and the electronic certificate all obtained and stored in the memory 61 at every access, and provide the same to the requester. Otherwise, the certificate providing function 59 may store and provide only the copy of the web page 31 obtained at a first access, all of attribute information, and all of electronic certificates, if the web page 31 does not change its contents at one or more later accesses.

Moreover, the certificate providing function 59 may generate an access record that includes a URL, an access source IP address, and a certificate releasing time period and date from the attribute information and the electronic certificate. Thus, the service provider may provide a prescribed certificate including the access record, the web page 31 obtained at a time of the first access, all of the attribute information, and all of the electronic certificates.

However, the certificate providing function 59, of course, may not provide the requester with the copy of the web page 31 if the preservation function 57 does not preserve the copy of the web page 31.

The above-discussed second type of service provided by the present invention is now described with reference to the system illustrated in FIG. 1.

As described earlier, in the second type of service, a requester requests a service provider to display a link to a prescribed web page so that the public can have notice of both the existence and the location of the web page. Responsive to the request, the service provider may display a link 91 to the prescribed web page 31, which is for example stored in the first server 3, on a web page of the fourth server 9. If a number of such requests are relatively small, it is sufficient to display only a URL of the prescribed web page on the web page of the fourth server 9.

However, if a number of requests are relatively large, a database of the link 91 may preferably be constructed so that a third person can retrieve a prescribed link based on contents of a web page or an industry sort of a requester via the network 1. The service provider may store a set of time periods during when a link 91 to a web page 31 has been displayed on the web page of the fourth server and retrieval has been available, and provide a requester or the like with such records as a certificate.

The above-discussed third type of service provided by the present invention is now described in further detail referring to the system illustrated in FIG. 1.

As noted earlier, recordation of an event that a prescribed web page designated by a requester may be retrieved using the fifth server 11 as a retrieval engine for public use via the network 1 may be requested from the requester to the service provider. The service provider may retrieve the prescribed web page with the retrieval engine using an appropriate keyword or the like via the second server 5. If the prescribed designated web page can be retrieved, the service provider may record that fact, a name and IP address of the fifth server 11, the keyword, or the like, and the retrieval time and date, or the like. Upon a request, such a record may be provided to a requester as a prescribed certificate for certifying the existence of the web page as a prior art.

The above-discussed fourth type of service provided by the present invention is now described in further detail with reference to the system illustrated in FIG. 1.

As noted earlier, a transition of versions of a web page 31 may be recorded upon request to the service provider. The service provider may execute operations similar to those executed in the first service using the second server 5. Specifically, the service provider may access a web page 31 of the first server 3 at a specified timing and obtain a copy of the web page 31. Subsequently, the service provider may generate attribute information including the URL and the access condition, and obtain an electronic certificate with regard to the attribute information and the copy of the web page 31. The service provider may then preserve at least the attribute information, the electronic certificate, and preferably the copy of the web page 31 in the memory 61.

Subsequently, the service provider may again access, by executing similar operations, the prescribed web page 31, for example of the first server 3, at a later specified timing, and obtain a new applicable electronic certificate with regard to new attribute information and the copy of the web page 31. The service provider may then determine whether the copy of the web page 31 obtained at the first access (i.e., the web page 31 whose last change is being detected) is different in contents from those of the copy obtained at the current access. This determination may be performed either by the copy obtaining function 51 or the preservation function 57. If the contents are different from each other, such a fact may be recorded in the memory 61 in addition to at least the new attribute information and the new electronic certificate.

As one example, a difference between the contents of the web page 31 obtained at the first access and those of the web page 31 obtained at the current access can be recorded in the memory. Otherwise, a copy of the entire changed web page 31 can be preserved in the memory (if both contents are different from each other). Upon a request, the service provider may provide such a record including at least the fact of change, the attribute information, and the electronic certificate. Only different portions or entire portions of the copy of the web page 31 may be provided when the contents are changed.

The above-discussed fifth type of service provided by the present invention is now described with reference to the system illustrated in FIG. 1.

A web page providing service for providing a web page and an electronic certificate may be executed. Specifically, the service provider may use a retrieving function 93 with the fourth server 9, and produce a database 95 from a plurality of electronic certificates stored in the memory 61, a plurality of copies of web page 31, and a plurality of attribute information. Thus, a third person can retrieve the database 95 using the retrieving function 93.

When recognizing a prescribed web page 31 to be used as a prior-art, a third person may send a request to the service provider for provision of recorded contents via the network 1 or the like. The service provider may then preferably obtain a copy of an applicable web page and applicable attribute information and an electronic certificate.

Subsequently, the service provider may utilize the certificate providing function 59 so as to store each of the applicable copy of web page 31, the applicable attribute information, and the electronic certificate in the CD-R to provide to the requester. Otherwise, such data can be transmitted via the network 1. As a modification, the service provider may produce an abstract of the web page from one or more copies of a web page so as to construct the database 97 so that a third person can retrieve a prescribed abstract using the retrieving function 93. The third person may then confirm a corresponding copy of a web page 31 and request applicable recorded contents of necessary electronic information based on a result of screening of the abstract database 97.

Figure 2:
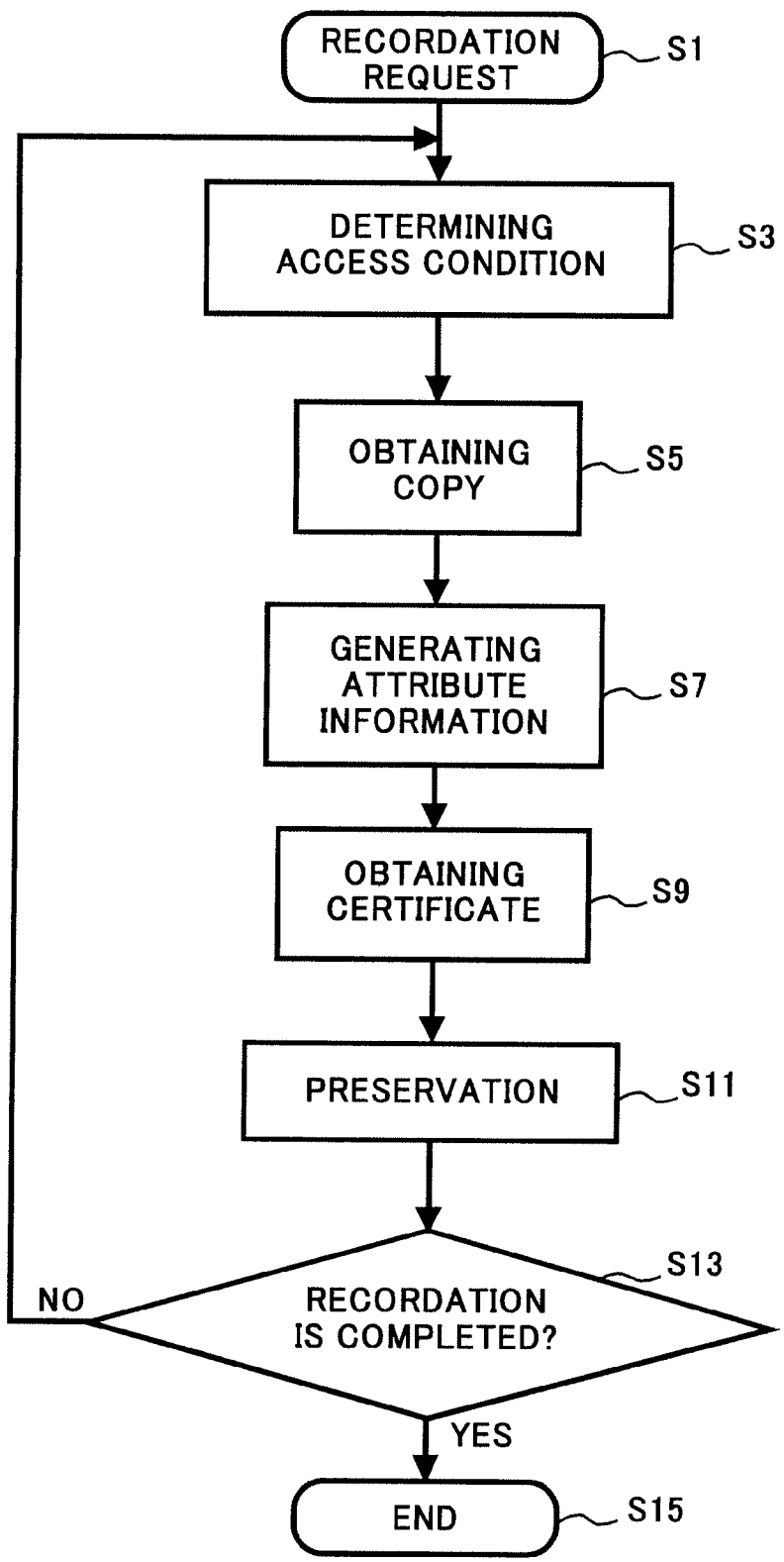
FIG. 2 is a flowchart illustrating a first example of a certifying operation practiced in a service provider's server in response to a request for an electronic information recordation.

A procedure of the first type of service and its modified services provided by the present invention is now described with reference to a flowchart of FIG. 2.

When a requester requests the service provider to record prescribed electronic information such as a web page by designating both of its location (e.g. URL) and a recording condition such as a recording time period (in step S1), the copy obtaining function 51 may determine an access condition (in step S3) in accordance with the recording condition. The copy obtaining function 51 may then access a prescribed web page of the URL at a prescribed timing from a prescribed access source IP address, and obtain a copy of the web page (in step S5).

Further, the attribute information generating function 53 may generate attribute information from the URL of the web page and the address source IP address as an address condition (in step S7). After that, the certificate obtaining function 55 may obtain, from the time stamp certificate issuing function 71, an electronic certificate which specifies the attribute information and the copy of the web page with the certifying time and date (in step S9).

The second server 5 can be configured to include a function of the time stamp certificate issuing function 71, and the certificate obtaining function 55 can be replaced with time stamp certificate issuing function 71. The preservation function 57 may then store at least the attribute information and the electronic certificate in the memory 61 (in step S11). That is, as described earlier, the copy of the web page may optionally be preserved in the memory 61. These operations may be repeated until a recordation terminating condition is satisfied (in step S13). The recordation terminating condition may include several factors such as elapsing of a prescribed recording time period or reaching a prescribed number of recording times, which may be designated by the requester.

Figure 3:
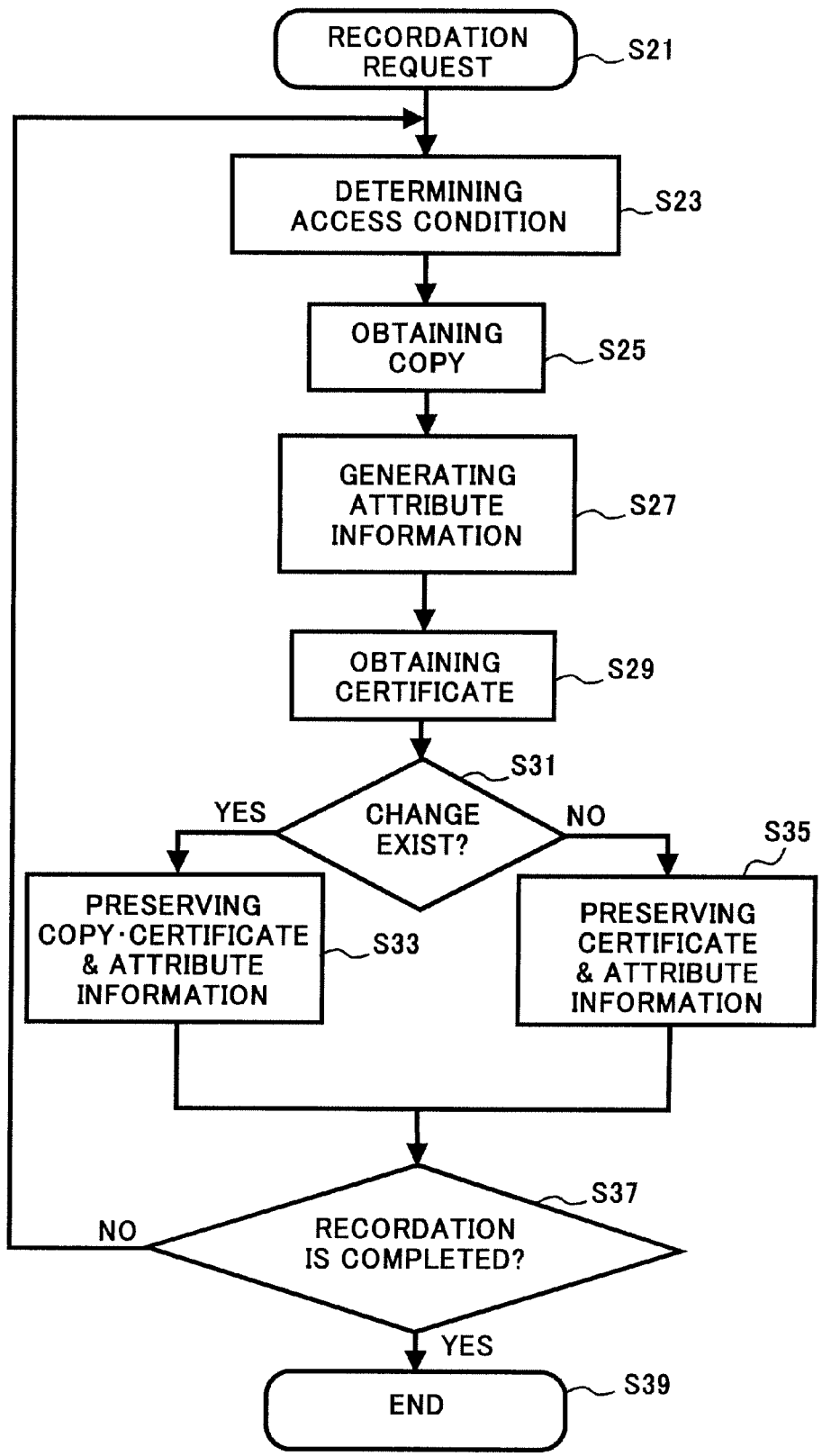
FIG. 3 is a flowchart illustrating a second example of a certifying operation practiced in a service provider's server in response to a request for an electronic information recordation.

An operational flow for the fourth type of service is now described with reference to FIG. 3.

When a requester requests the service provider for recordation of electronic information such as a web page by designating both of its location (e.g. a URL) and a recording condition such as a recording period of time (in step S21), the copy obtaining function 51 may determine an access condition in accordance with the recording condition (in step S21). The copy obtaining function 51 may then access the web page of the URL at a prescribed timing from a prescribed access source IP address, and obtain a copy of the web page (in step S25).

The attribute information generating function 53 may then generate an attribute information from the URL of the web page and the access source IP address as an access condition (in step S27). After that, the certificate obtaining function 55 may obtain, from the time stamp certificate issuing function 71, an electronic certificate which specifies the copy of the web page and the attribute information (in step S29). The preservation function 57 may then examine whether contents of the copy of the web page previously accessed and obtained are different from those of the copy of the web page currently accessed (in step S31). Such an examination may be performed in such a manner that the copy of the web page whose change is lately detected and stored in the memory 61 is read and compared with the copy of the web page currently accessed.

When any change is detected (yes in step S31) the copy of the current web page, applicable new attribute information, and an applicable electronic certificate may be tied up and collectively preserved in the memory 61 (in step S33). On the other hand, when a change is not detected (no in step S31), only the new attribute information and the new electronic certificate may be preserved in the memory 61 (in step S35). These operations are repeated until a recordation terminating condition is satisfied (in step S37). When the above noted operational flow is completed, prescribed electronic information may be preserved in various manners and a transition of the prescribed web page may be certified.

Figure 4:
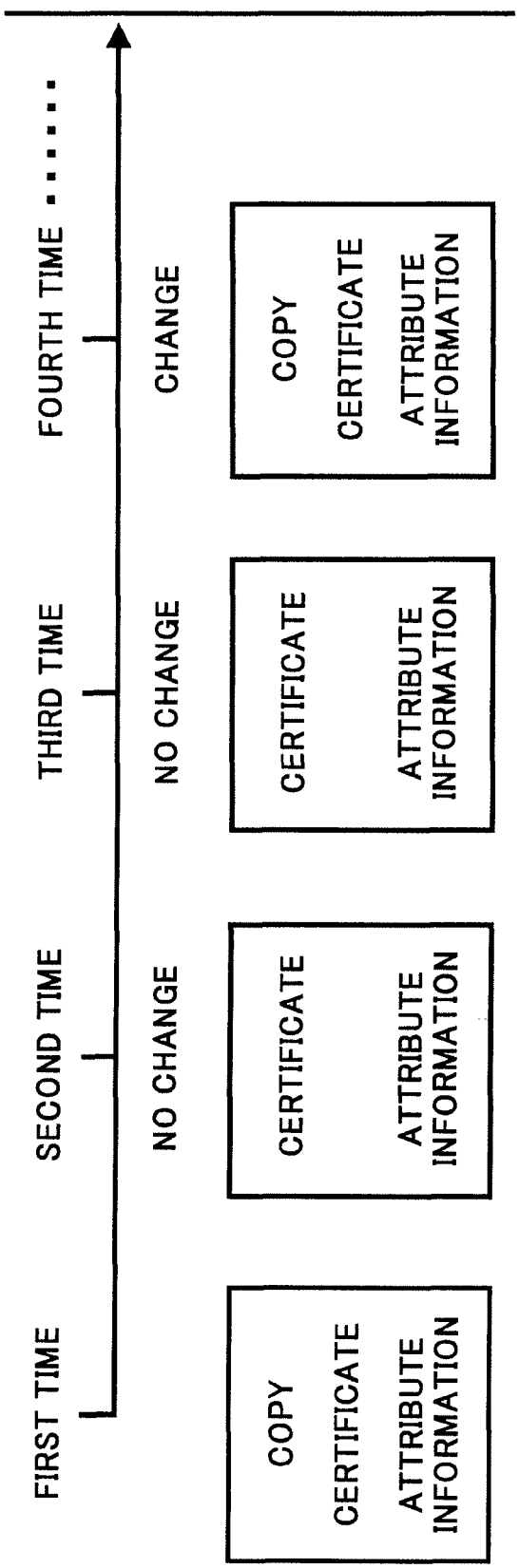
FIG. 4 is a chart illustrating one example of a sort of information to be preserved when prescribed electrical information to be certified is periodically accessed in the second example as illustrated in FIG. 3.

Various manners of preserving the electronic information are now described with reference to FIG. 4.

During a first access, a copy of the prescribed web page, applicable attribute information, and applicable electronic certificate may be collectively preserved because it is considered that all of the electronic information of the web page is changed. During a second access, a copy of the prescribed web page currently obtained may be compared with that of the prescribed web page preserved at the first access. Only an updated electronic certificate and updated attribute information may collectively be preserved if no change exists between the previous and current copies of the web pages.

Moreover, during a third access, a copy of the prescribed web page currently obtained may be compared with that of the prescribed web page preserved at the first access. Only an updated electronic certificate and updated attribute information may be preserved if no change exists between the previous and current copies of the prescribed web pages.

During a fourth access, a copy of the prescribed web page currently obtained may be compared with that of the prescribed web page preserved at the first access. The copy of the web page currently obtained, updated attribute information, and an updated electronic certificate may collectively be preserved if a change exists between the previous and current copies of the prescribed web pages. Similar operations may be continuously performed at a prescribed frequency designated by the requester. A comparing objective may be a copy of a prescribed web page whose last change is detected and preserved as mentioned earlier.

Figure 5:
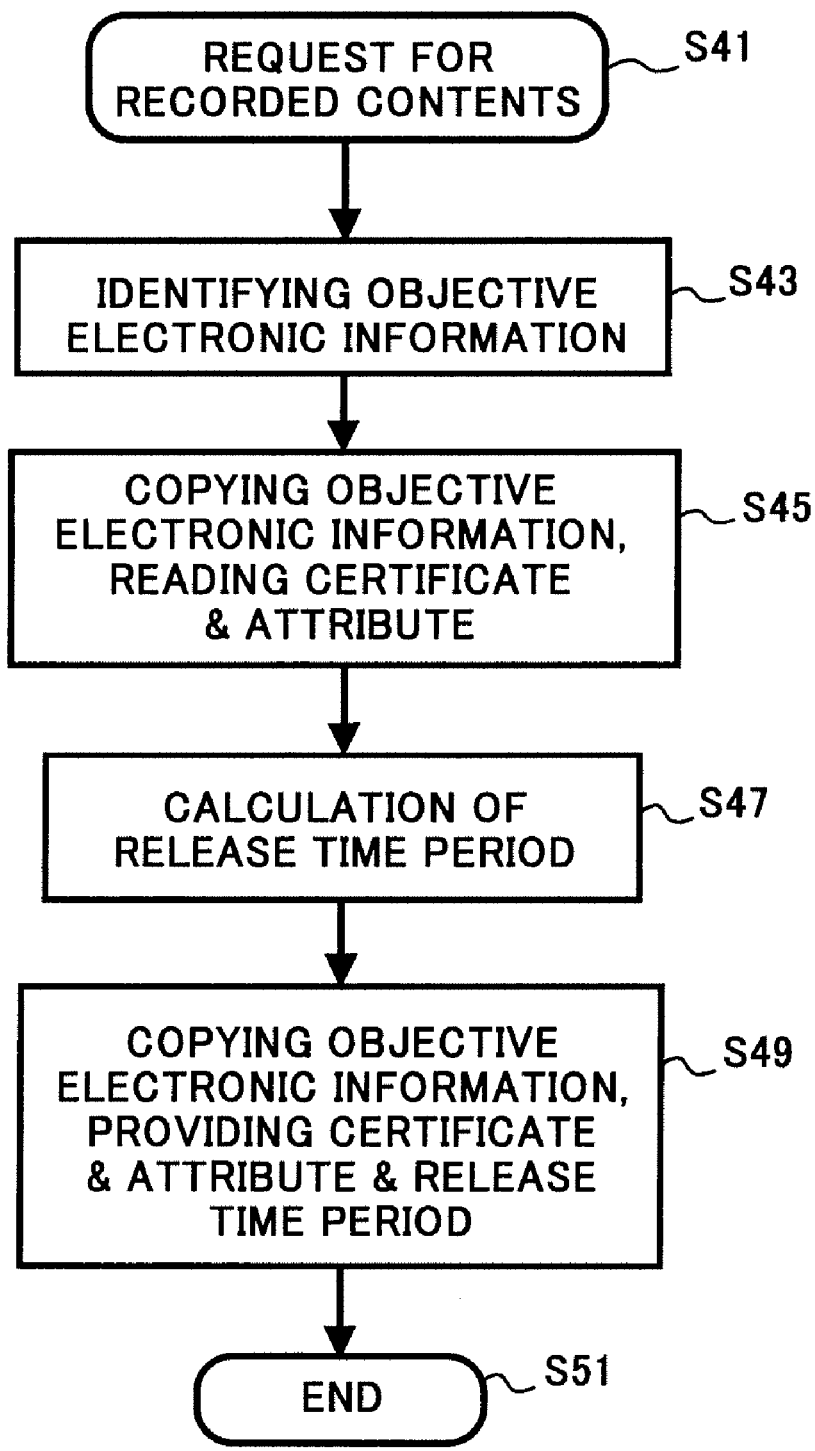
FIG. 5 is a flowchart illustrating a third example of a certifying operation wherein an electronic certificate, which specifies prescribed electronic information and attribute information, is issued to a service requester.

A modified operation performed by the second server 5 in response to a request from a requester for recorded electronic information is now described with reference to an operational flow illustrated in FIG. 5.

Since electronic information (i.e., a web page) is included in a request from a requester as an objective, the certificate providing function 59 may first specify the prescribed electronic information (in step S43), and read a copy of the objective electronic information, applicable attribute information, and an applicable electronic certificate from the memory 61 (in step S45). Only one set of data may generally be read when the request designates only one time recordation of the electronic information or an objective electronic information results in deletion after the first access.

However, since a plurality of the electronic information are generally recorded, a plurality of sets of copies of the electronic information, applicable attribute information, and applicable electronic certificates may generally be read. In such a case, the certificate providing function 59 may time an electronic information-releasing period of time (in step S47). The electronic information-releasing period of time may be recognized if a pair of the electronic certificates respectively including the certifying time and date are obtained respectively at a first access and a last access and each certifying time and date is compared with the other. To this end, such information may be regarded as the electronic information-releasing period of time. However, such a function may be optional.

The certificate providing function 59 may finally store, for example into the CD-R, the copy of the objective electronic information, applicable attribute information, and an applicable electronic certification beside the electronic information-releasing period of time (in step S49).

Figure 6:
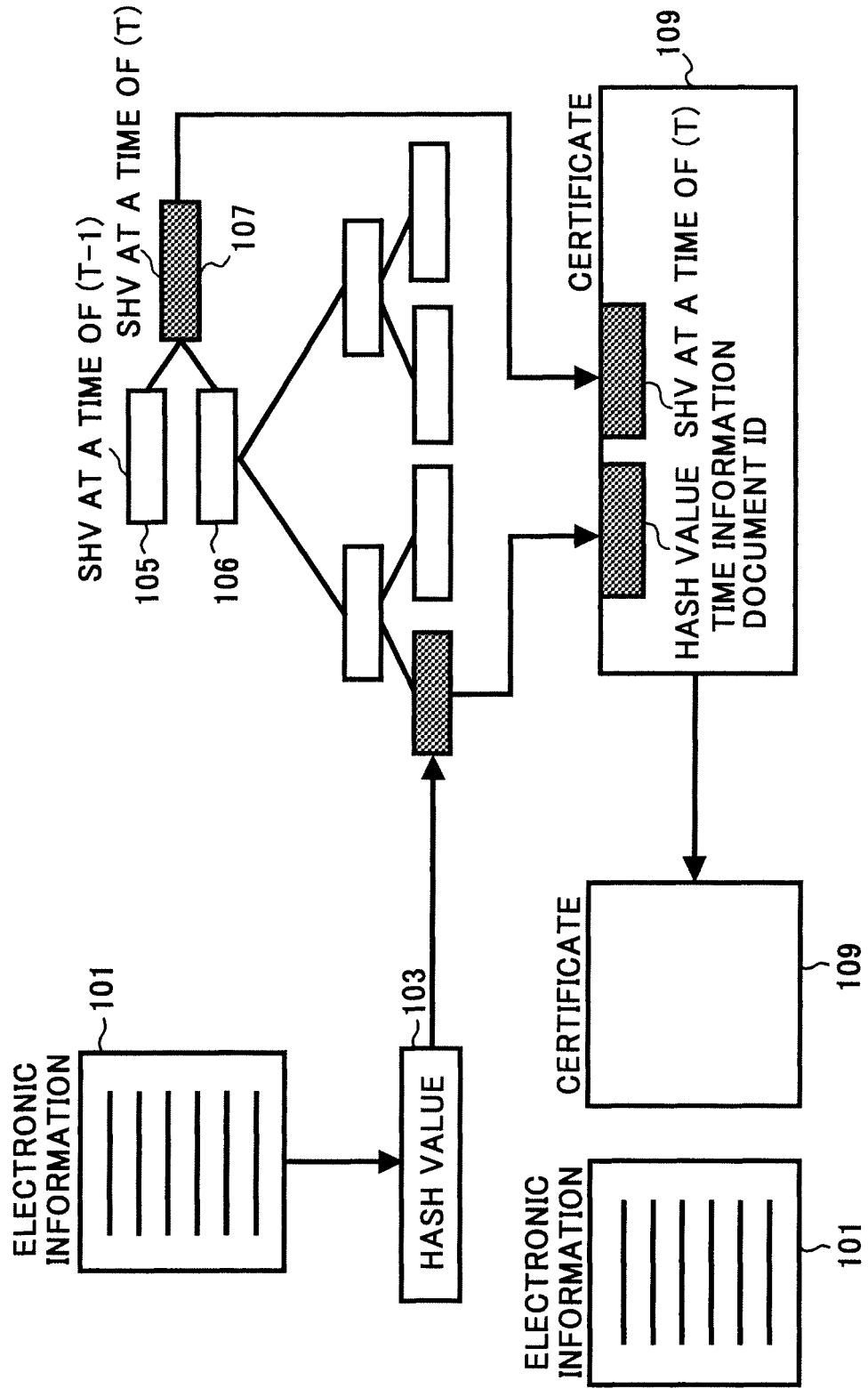
FIG. 6 is a chart illustrating one example of a process for generating a hash value communicated between the service provider's server and a time stamp certificate issuing server illustrated in FIG. 1 when the electrical certificate is to be issued.

One example of generating the electronic certificate is now described in detail referring to FIG. 6.

The electronic certificate can be issued in any manner in the present invention as long as the electronic certificate uniquely specifies an electronic information and its attribute information. Thus, the following is one example among various systems to issue the electronic certificate. When electronic information 101 is an objective of an electronic certificate, a hash value 103 of the electronic information 101 may be calculated. Such a hash value and calculation manner are described in detail in the U.S. patent application Ser. No. 441,056/99 filed by the same applicant, the entire contents of which are hereby incorporated herein by reference. However, any hash function is suitable as long as it includes one way function in the present invention.

The certificate obtaining function 55 may calculate the hash value 103 at least of both of the copied electronic information and its attribute information. The certificate obtaining function 55 may transmit a request with the hash value 103 to the time stamp certificate issuing function 71 for issuance of an electronic certificate. The time stamp certificate issuing function 71 may receive and process the hash value 103 (indicated by a grid area) in a prescribed manner together with another hash value sent from the same or a different computer server (indicated by blanks of the right side of the hash value 103). The another hash value may separately be calculated and transmitted to the certificate obtaining function 55 in the same manner as the hash value 103. The time stamp certificate issuing function 71 may repeat generating a new hash value from two hash values in a tournament system, for example, so that only one hash value 106 may finally be obtained as illustrated in FIG. 6.

A super hash value (hereinafter referred to as a SHV) 107 may then be generated at a time (T) from the hash value 106 and a SHV 105 (i.e., last super hash value) at a time (T−1), wherein (T) is an integer. The SHV 107, the hash value 103, time information, and a document ID of the electronic information (e.g. a file name) may be included in the electronic certificate 109.

Thereby, the electronic certificate 109 can uniquely specify the electronic information 101 (i.e., a web page) and/or the attribute information using the combination of the SHV 107 and the hash value 103. The electronic certificate 109 may then be returned to a sender of the hash value 103 (i.e., the certificate obtaining function 55). As a result, the electronic information 101 and the applicable access time and date may uniquely be specified and tied up with the electronic certificate 109. The hash value 103 itself or in combination with the SHV 107 may constitute an inherent information related to the combination of the electronic information and the attribute information.

Specifically, if any one of the electronic information and the attribute information is falsified after the certification by the time stamp function, the hash value varies after the falsification. Thus, if the hash value in the attribute information included in the electronic certificate is not changed, the corresponding electronic information, for example, included in the CD-R can be regarded as accessed at the time and date also included in the CD-R. Thus, in such a case, the CD-R can be prescribed evidence such as in a patent related field.

Further, if a web page is the electronic information as illustrated in FIG. 6, an HTML 110 document may correspond to the electronic information. Thus, as understood from FIG. 7, a hash value may be calculated from all of attribute information including a URL and an access source IP address or the like, and the HTML document 110, and an applicable electronic certificate may be generated from the hash value. If prescribed a web page is only composed of a composition, such calculations are sufficient.

However, since an image file 112 such as a GIF file may be embedded in the web page, and an image file may also be included in information released on the network, a hash value may be calculated from all of the image file, the HTML document, and applicable attribute information.

Moreover, the image file in the HTML document is not limited to a static image and may include an active image, a sound, a file having a format requiring Plug-in software of a browser, and JAVA(™ of Sun Microsystems) Applet. Thus, if these objects are embedded, these objets may also be copied at an access designating a prescribed URL, and the above described hash value calculation may be executed. Such a hash value can be calculated per one file or once for all of the files.

Thus, release of electronic information on the network can be certified by the first type of service and its modified services. Further, public notification with respect to the existence and the location of prescribed electronic information can be certified by the first and second types of services.

Further, a transition of an electronic information can be recognized by the fourth type of service.

Further, a service provider can efficiently utilize electronic information together with an electronic certificate, and a requester can prompt the public to use prescribed electronic information. In addition, a third person can obtain enforceable electronic information.

Further, using such a system in a patent related field, electronic information, applicable attribute information, and an applicable electronic certificate can be utilized as evidence to be submitted to an examiner when filing an opposition or a patent invalidating procedure.

Further, someone's own web page or the like can be utilized as a technical report publication.

Further, an applicable electronic certificate can be utilized in a prescribed condition as evidence to be submitted to an examiner when application of a prescribed patent act, with rules of an exception of lack of novelty, is requested.

Even though five or more functions of the second server 5 are included in a single unit as noted from FIG. 1, these functions can separately be included in respective of a plurality of servers.

Similarly, even though the fourth server 9 displays one or more links to prescribed web pages and retrieves a prescribed web page, these functions can separately be performed by respective of a plurality of servers. The retrieval engine 1 may not be limited to one.

Further, the URL may not be limited to the "http", and a "ftp" can be utilized. The function of the third server 7 can also be included in the second server 5. Each of the service providers performing services with respect to the third server 7 and the second server 5 can be either the same or different providers.

The network 1 may not be limited to the Internet and may include other networks which allow non-exclusive access.

Moreover, even though the CD-R 63 is utilized as a medium storing the recorded electronic information to be provided to a requester, a CD-ROM, DVD, etc. can be employed. A separating manner which separates a plurality of functions as illustrated in FIG. 1 is just one example, and even one function can be divided into a plurality of function segments. To the contrary, a plurality of functions can also be united into one.

A system can be structured by combining one or more programs with a plurality of computers realizing functions as illustrated in FIG. 1. Otherwise, the system can be either partially or entirely realized using a private use electronic circuit or the like.

Another embodiment of the present invention is now described with reference to FIGS. 8 through 16.

When a web page is the electronic information 101 as illustrated in FIG. 6, a hypertext markup language (hereinafter referred to as an HTML) document corresponds to the electronic information. No problem occurs if contents of the web page include only composition data.

Figure 8:
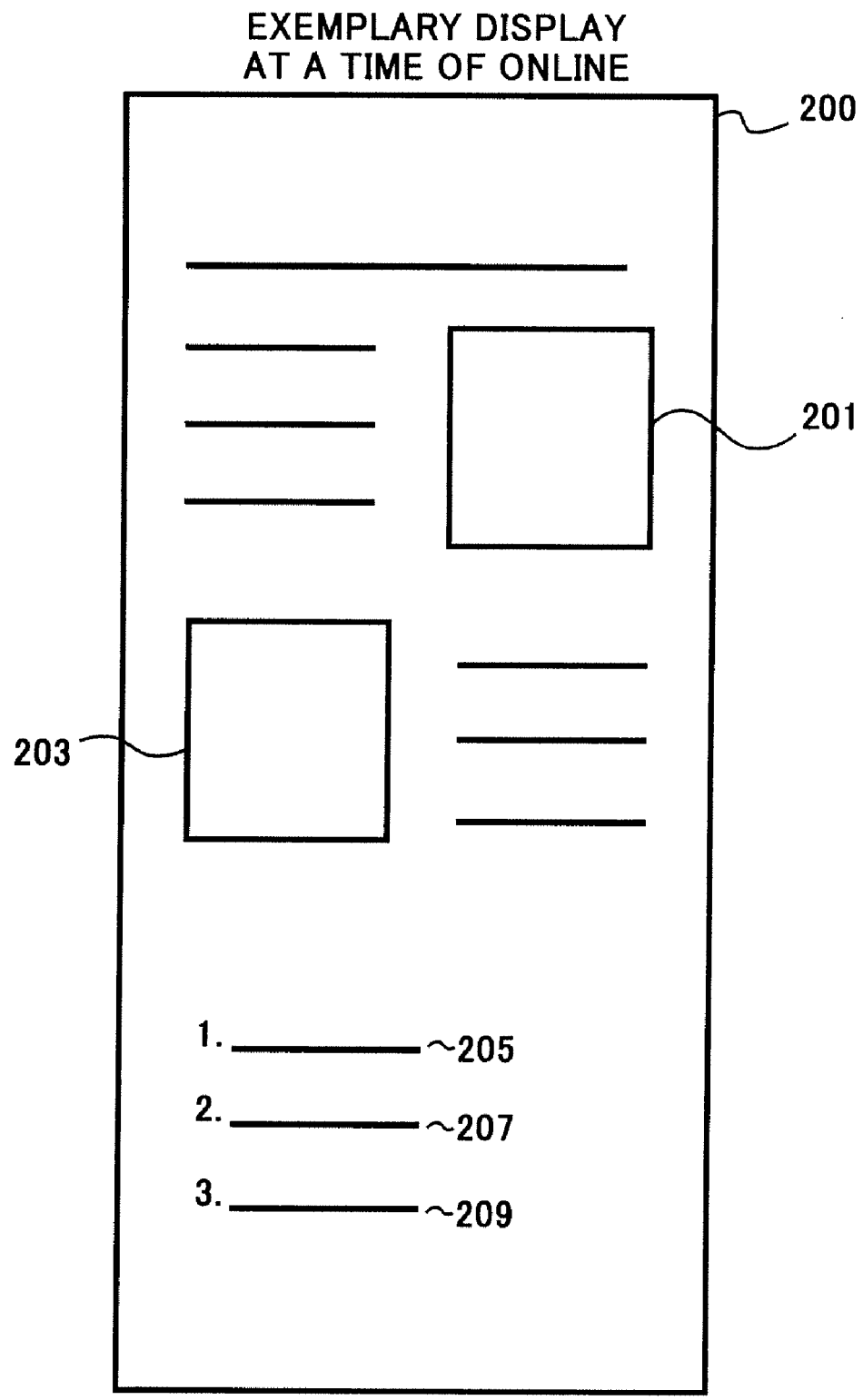
FIG. 8 is a chart illustrating a conventional display screen of a web page to be inspected online.

However, image files such as GIF files are often embedded in web pages. For example, and as illustrated in FIG. 8, when a web page 31 of the first server 3 is inspected using a browser of a client computer (not shown) coupled to the network 1, it may be displayed looking like a web page 200 which includes a plurality of prescribed objects 201 and 202 such as a static image embedded inline. Such an object embedded in the web page 200 may include in addition to a static image, an animation, a sound, a file having a format requiring a Plug-in software or the like of the browser, a Java(™ of Sum Microsystems Corporation) Applet, etc., as described in the first embodiment, and generally be included in information released on the network 1.

Further, a plurality of links 205 through 209 linking to another web page or another object may be included in the web page 200 as an external resource as illustrated in FIG. 8. Contents of the linking destination web page or object can not be released on a web page of a prescribed URL, generally.

However, a user of the network 1 can readily obtain electronic information of the linking destination, and accordingly, that information is available to the public. Moreover, the web pages or objects of the destinations of the plurality of the links 205 through 209 respectively includes a prescribed relationship with the web page 200. Thus, a person who generates an HTML document of the web page 200 may occasionally intend integrally to disclose information of the web page 200 and the linking destination web page or object. Then, a problem occurs whether such a linking destination web page or an object is to be included in an objective of the electronic certificate.

Figure 9:
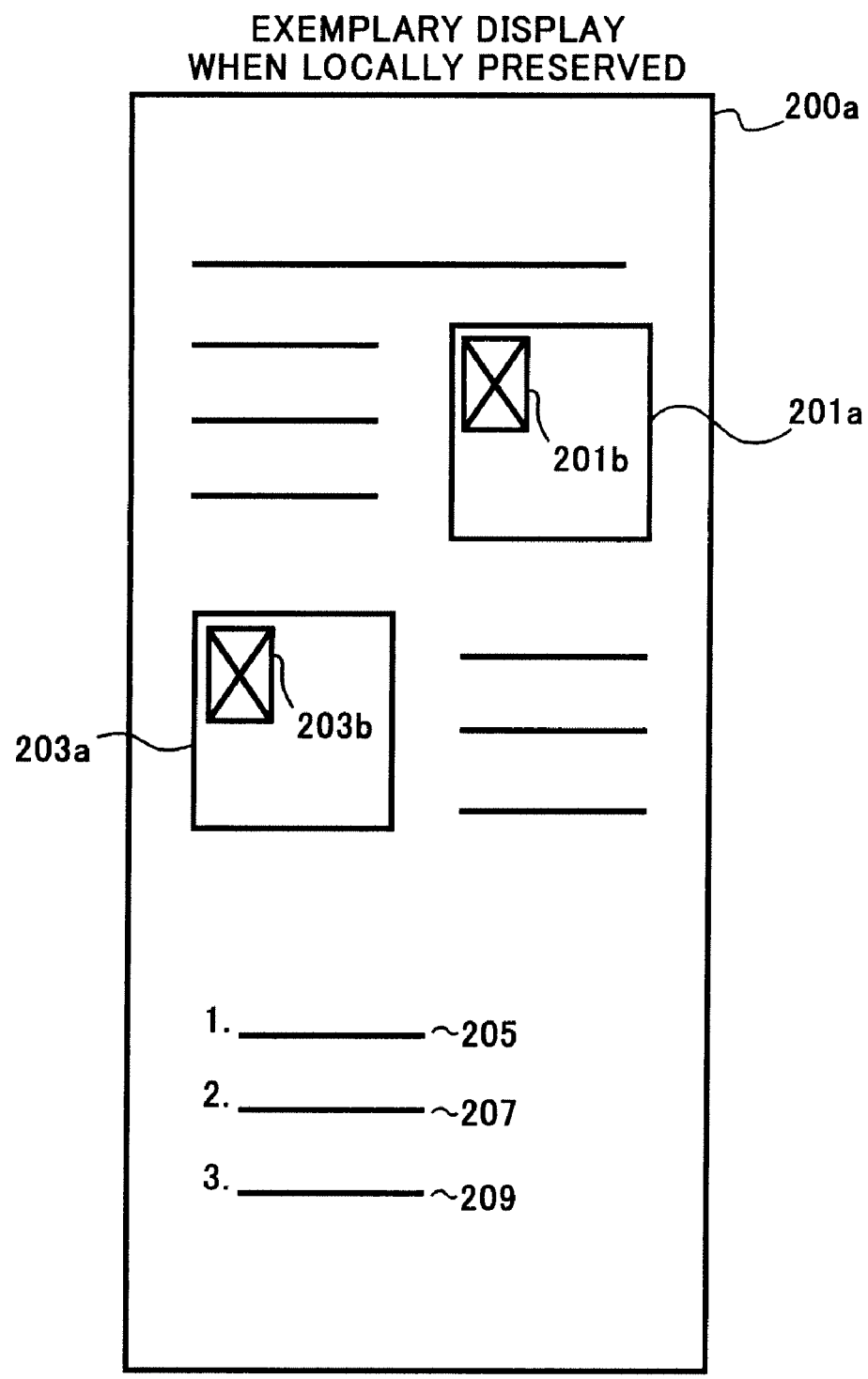
FIG. 9 is a chart illustrating a display screen of a web page when inspected offline.

In addition, when the HTML document and the plurality of the objects 201 and 203 as illustrated in FIG. 8 are locally preserved (i.e., stored in a personal computer), for example, in the second server 5, as respective files, and the HTML document is inspected using the browser, only a plurality of frames 201*a* and 203*b* of the objects 201 and 203 are displayed in the web page 200*a* as illustrated in FIG. 9. In a particular case, prescribed marks 201*b* and 203*b* respectively representing failure to read may be displayed in the respective frames. Moreover, when the plurality of links 205 through 209 is selected using a pointer, none of the linking destination web pages or objects can be inspected. This is because the following description is included in the HTML document of the web page 200 as one example.

The below-described first list illustrates a case in which a prescribed object is embedded inline. The below-described second list illustrates a case in which a prescribed external resource is utilized through a link.

[First List]

```
<IMG SRC ="/image/image01.gif">
<OBJECT DATA ="/video/video. avi" TYPE "= video/avi">
</OBJECT>
<APPLET CODE ="/applet/animator. Class" WIDTH=100 HEIGHT=100>
</APPLET>
```
[Second List]

```
<A HREF="/image/image02.gif" > 1. IMAGE </A>
<A HREF=" http://xyz.co.jp/home.html"> 2. web page </A>
```

The first line of the first list represents that a directory named "image" exists below a directory where an HTML document of the web page 200 exists, and a GIF file "image01.gif" is displayed. Thus, when the HTML document is locally preserved in the second server 5 it is, of course, not guaranteed that the directory named "image" exists below the directory preserving the HTML document nor that "image01.gif" is preserved in it.

Further, the second line of the first list represents that a directory named "video" exists below a directory where an HTML document of the web page 200 exists, and an animation file named "video/avi" is displayed in a MIME form. Thus, when the HTML document is locally preserved in the second server 5 it is, of course, not guaranteed that the directory named "video" exists below the directory preserving an HTML document nor that "video avi" is preserved in it.

Further, the third line of the first list represents that a directory named "Applet" exists below a directory where an HTML document of the web page 200 exists, and Java applet "animator.class" is practiced. Moreover, it represents that a prescribed display is displayed within a frame of 100×100. Thus, similarly to the above, if the HTML document is locally preserved in the second server 5, it is not guaranteed that the directory named "applet" exists below the directory preserving the HTML document nor that the "applet.class" is preserved in it.

Further, the first line of the second list represents that a directory named "image" exists below a directory where an HTML document of a web page 200 exists, and a link affixed to a GIF file "image02.gif" is displayed. Since only the link is displayed and contents of the applicable file are not displayed when the HTML document is displayed, the contents of the file are not automatically transmitted via the network 1. Thus, when the HTML document is preserved in the second server 5, it is guaranteed that not only the directory named "image" exists below the directory preserving the HTML document, but also that the "image02.gif" is preserved in it.

Further, the second line of the second list represents that a link is displayed on a web page having an URL of "http://www.xyz.co.jp/home.html", not on the URL of the server that preserves the HTML document of the web page 200. As a result, since the link is only displayed and contents of the applicable file are not displayed when the HTML document is displayed, the contents of the file are not automatically transmitted via the network.

Moreover, if the HTML document is preserved in the second server 5, the preservation destination can not be "http:// www.xyz.co.jp/home.html". Thus, if an HTML document of a web page 200 is locally preserved, and contents of its file are to be confirmed using the browser or the like, an object embedded inline and contents of the linking destination can not be inspected.

As a result, contents released on the network 1 will not entirely be recognized later, even if the HTML document is preserved. To this end, the second embodiment may preserve one of copies of the HTML document of the web page 200 as an original as it is, and the other copy whose contents are changed in a prescribed manner so that the entire web page will be recognized when inspected. Specifically, the HTML document of the web page may be changed in the following manner in cases corresponding to the first and second lists.

[Third List]

<IMG SRC =" image 01.gif">
<OBJECT DATA =" Video. avi" TYPE =" video/avi"> </OBJECT>
<APPLET CODE ="animator. class" WIDTH = 100 HEIGHT = 100>
</APPLET>
[Fourth List]

<A HREF ="/reference/image 02.gif"> 1. Image </A>
<A HREF ="/reference/home. Html"> 2. Web page </A>

The third list may represent that an object embedded inline is preserved in a same directory with the HTML document that is changed in the prescribed manner. This is because it is simpler in a supervising point of view to preserve attribute information, an electronic certificate, and an HTML document or its version of the web page 200 all obtained or generated during an access in the same directory with the object.

That is, however, just one example, and another rule can be adopted when data is stored in the memory 61, for example, in a manner such that a plurality of directories are separately assigned and respectively store objects embedded inline. The fourth list may represent that an object referred to as an external resource or an HTML document of another Web page may be preserved in a directory named "reference" existing below a directory that preserves a HTML document, for example, which has changed. Namely, a separate directory may preferably be assigned to store the object or the changed HTML document because the object or changed HTML document is sometimes not required.

That is, however, just one example, and another rule can be adopted when data is stored in the memory 61. For example, the object or the HTML document can be preserved in the same directory with an original or changed version of the HTML documents. In any case, either a web page includes the inline object or the web page includes an object and/or another web page of the external resource, all of the HTML document, and each of the objects may be preserved as it is as an original file.

Figure 10:
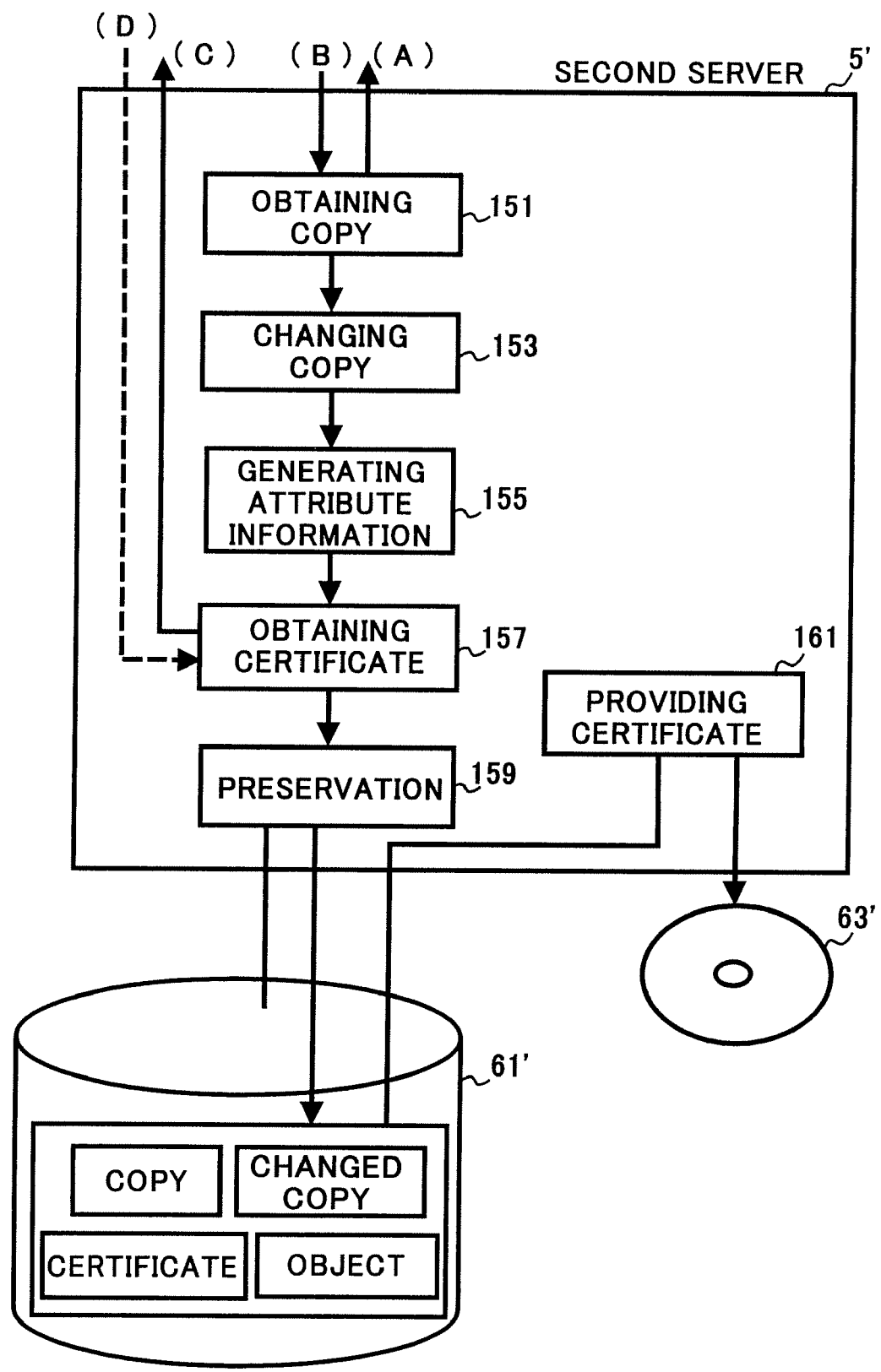
FIG. 10 is a block chart illustrating a function of a modified service provider's server 5' that is switched from and utilized in lieu of the service provider's server 5.

In addition, the HTML document is changed and preserved for inspecting use as another file. An applicable electronic certificate may then be obtained with regard to these files and the attribute information. Thus, a construction of the second server 5 illustrated in FIG. 1 may be changed to that of a second server 5' as illustrated in FIG. 10. Namely, the copy obtaining function 151 may obtain, beside designated electronic information, an object embedded inline, and an object and/or another electronic information all referred to as an external resource.

The copy changing function 153 may then change, as described above, the object, and a reading source of another electronic information. The attribute information generating function 155 may then generate attribute information associated with the object and that electronic information. In such a case, its reference destination of the reading source may sometimes be included in the attribute information, if a copy of the electronic information or the object of the reference destination has already been obtained.

In addition, prescribed information representing that whatever copy of a file is an objective of an electronic certificate may occasionally be included in the attribute information. The certificate obtaining function 157 may then obtain an electronic certificate with regard to the certificate-issuing objective from the time stamp certificate issuing function 71. The preservation function 159 may then store a file of the certificate-issuing objective in a prescribed position in the memory 61'. Thus, the memory 61' may store the copy of the electronic information, its version, an applicable electronic certificate, and applicable object, for example, embedded. The certificate providing function 161 may then read a prescribed information stored in the memory 61' in response to a request for prescribed recorded contents, and generate the CD-R 63'. Since the copy of the version of the electronic information and the object are included in the CD-R63', a certifying objective-electronic information can be reproduced in the same condition as released online.

Further, it is optional whether a copy of an electronic information before change may be preserved and whether that of the electronic information before change is provided, in response to a request for recorded contents.

Figure 11:
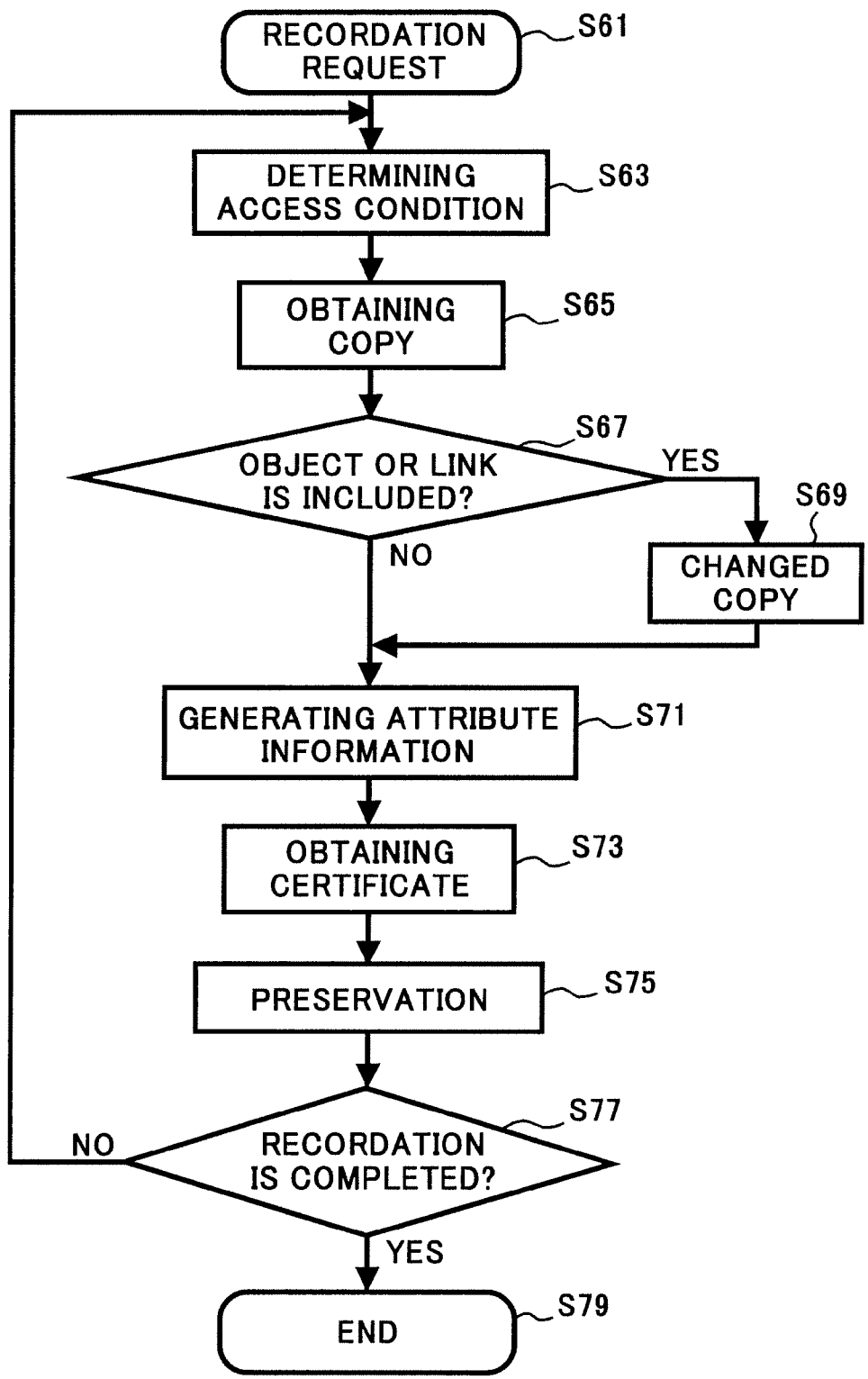
FIG. 11 is a flow chart illustrating a fourth example of a certifying operation practiced in the modified service provider's server 5' illustrated in FIG. 10 in response to a request for electronic information recordation.

An operational procedure executed in response to a recording request is now described referring to FIG. 11.

When a requester sends a request to a service provider for recordation of prescribed electronic information (e.g. a web page) while designating both its location (e.g. an URL) and a prescribed recording condition (e.g. a recording period of time) (in step S61), the copy obtaining function 151 may determine an accessing condition so as to accord with the recording condition (in step S63). The copy obtaining function 151 may then accesses the URL from a prescribed access source IP address at a prescribed timing and obtain a copy of the web page (in step S65). The recording request may occasionally include a designation of copies of web pages on different layers and linked with each other, and the copy obtaining function 151 may copy link destination web pages.

Subsequently, the copy changing function 153 may determine if the web page copy includes the objects or the like (in step S67). If the copied web page includes any one of them (yes in step S67), the copy changing function 153 may change the contents of the HTML document of the web page as illustrated in the fourth list (e.g. by assigning "/reference/") (in step S69) so that an object embedded inline in the copy of the web page, which will locally be preserved, can be displayed.

On the other hand, when the web page includes none of linking web pages and objects (no in step S67), the system progresses to step S71. Then, the attribute information generating function 155 may generate attribute information including both of a web page URL and an accessing source IP address as an accessing condition (in step S71).

Subsequently, the certificate obtaining function 157 may obtain the following electronic certificates from the time stamp certificate issuing function 71 (in step S73). The electronic certificates may include a certificate certifying the existence of the web page, the attribute information, the inline object or the version of the HTML document if any link exists, the HTML document, and the object referred to as the external resource. The preservation function 159 may then store all of information uniquely specified and certified by the electronic certificate with the time and date in the memory 61' (in step S75). The copy of the HTML document of the web page may optionally be preserved in the memory 61'.

These operations are repeated until the recordation terminating condition is satisfied (in step S77). The recordation terminating condition may be a condition when a recording time period designated by a requester has elapsed and when a number of recording times designated by a requester reach a prescribed level or the like.

Figure 12:
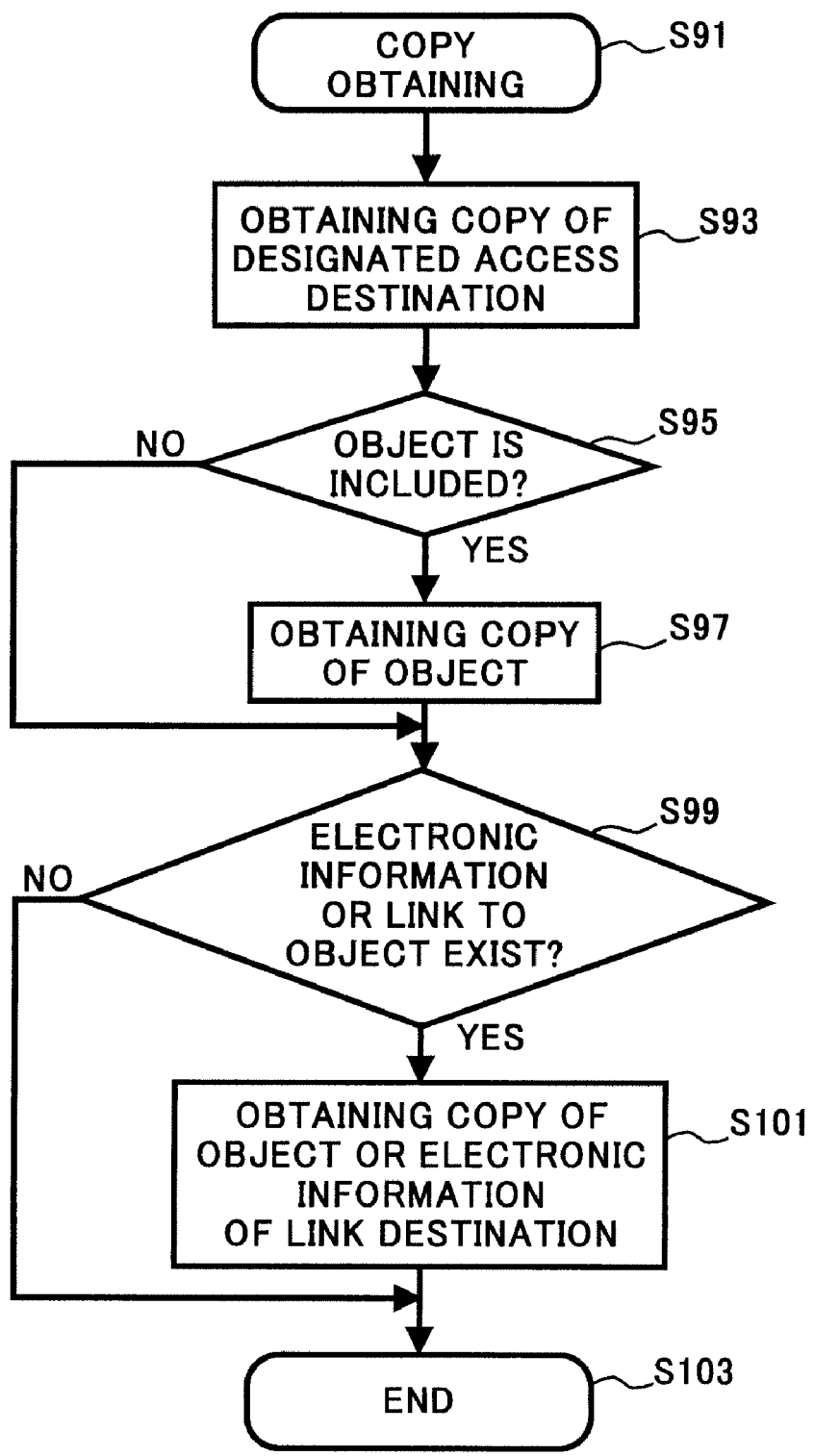
FIG. 12 is a flowchart illustrating details of a copy-obtaining step practiced in the certifying operation illustrated in FIG. 11 for obtaining a copy including an object.

The copy obtaining operation described with reference to FIG. 11 is now described with reference to FIG. 12 in further detail.

A copy of an HTML document of a prescribed web page as an access destination designated by a requester may be obtained (in step S93). The copy of the HTML document may then be analyzed and examined if an object embedded inline is included (in step S95). If the object is included, a copy of the object may also be obtained (in step S97). If the object is not included, the process goes to step S99.

Subsequently, it is determined if a link either with another web page or with another object exists (in step S99). If any one of them exists (yes in step S99), a copy of the HTML document of another web page as a linking destination or another object may be obtained (in step S101). If none exists (no in step S99), the process is terminated. As noted from FIG. 12, a web page and/or an object existing below a web page of access destination by one layer may be a copy objective range. Thus, if a web page and/or an object existing below the web page of the initial access destination by two or more layers are to be copied, an operation illustrated in FIG. 12 may be practiced while regarding such below web pages as the access destination in step S93. In such a case, if one or more linking destinations existing below a prescribed layer among these layers are not copying objective, the process may preferably be terminated without practicing steps S99 and S101. Thus, an electronic certificate may be obtained with regard to the information obtained and/or generated.

Figure 7:
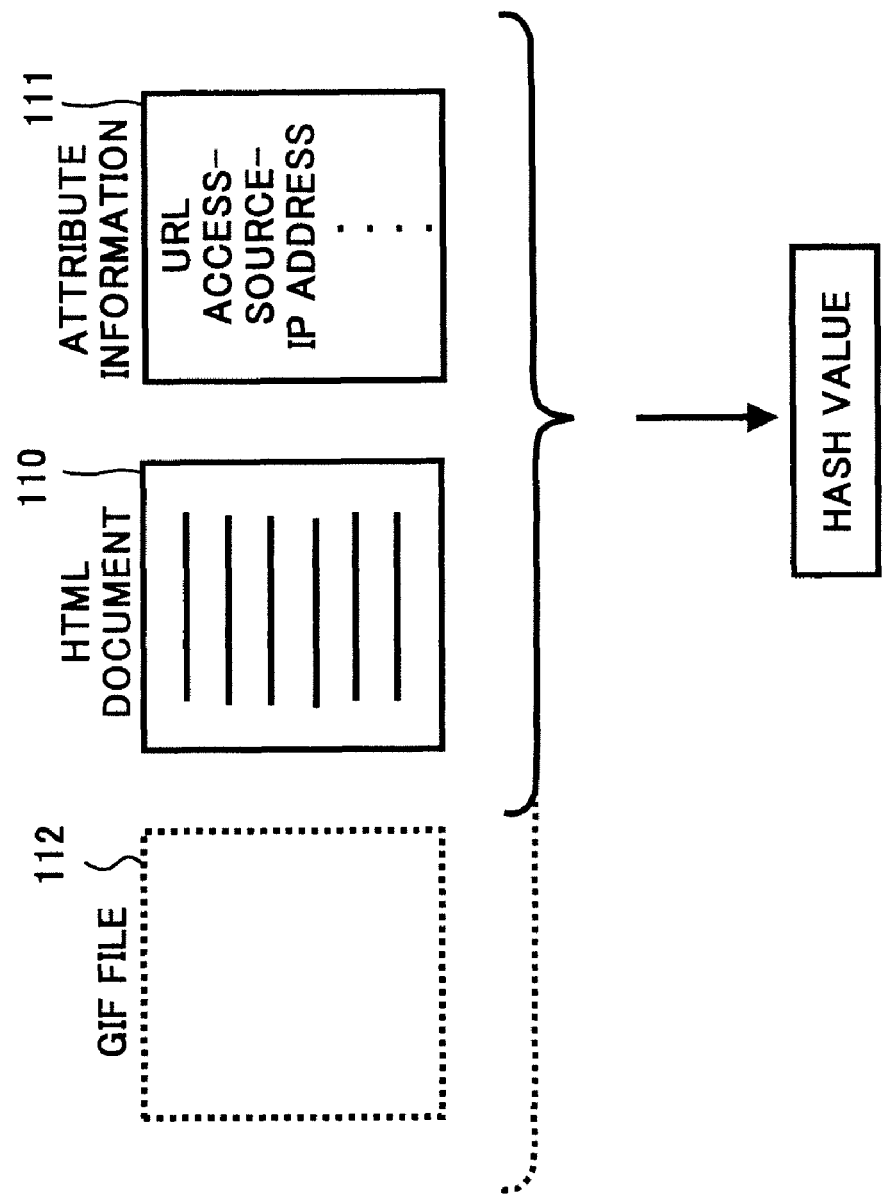
FIG. 7 is a chart illustrating one example of contents of an electronic certificate issued from the time stamp certificate issuing server illustrated in FIG. 1.

Further, if an electronic certificate described with reference to FIG. 7 is obtained, a hash value may be calculated by the following manners.

Figure 13:
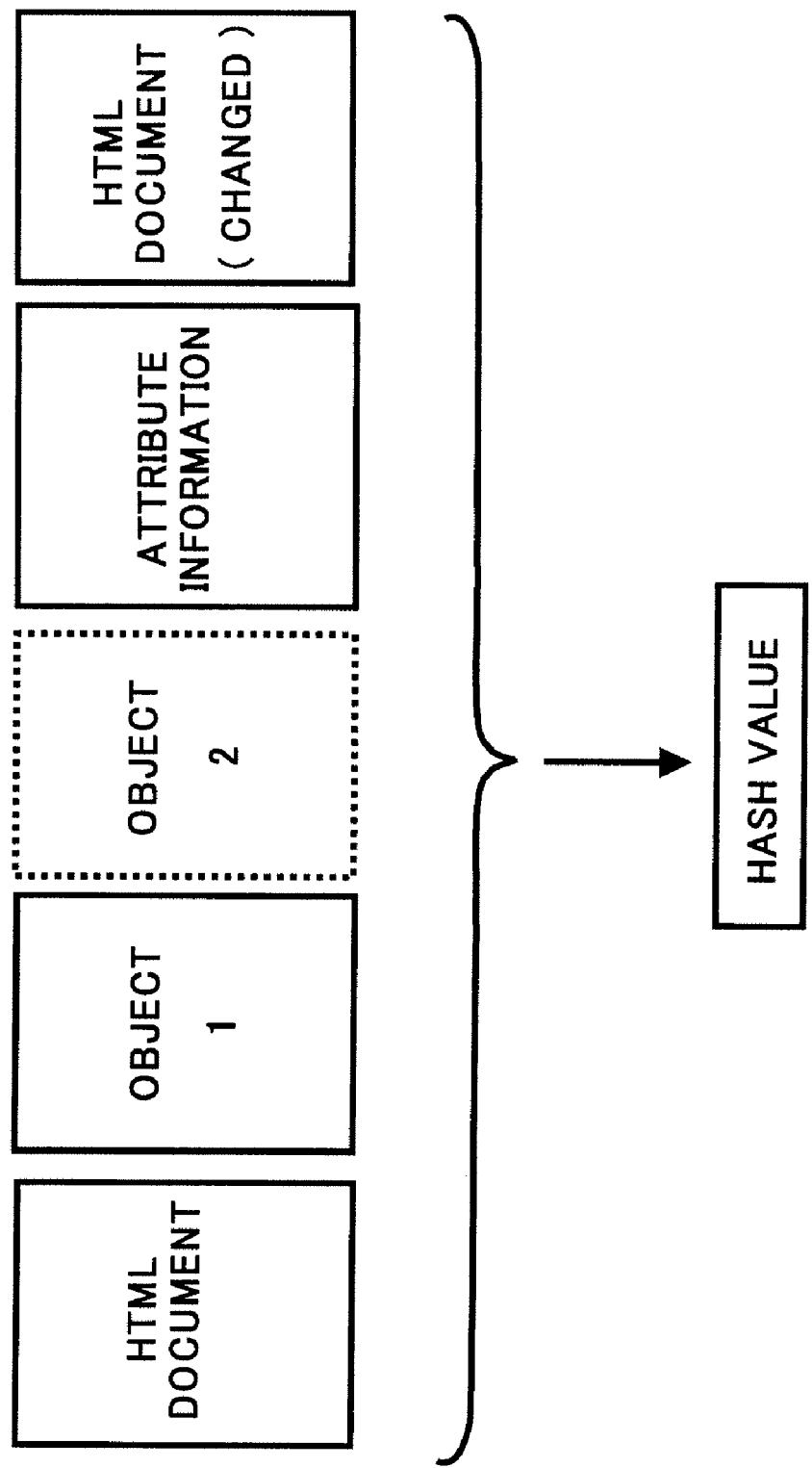
FIG. 13 is a chart illustrating one example of objectives to be calculated into a hash value.

If an object is embedded inline and an external resource is not referred to as illustrated in FIG. 13, totally one hash value can be generated with regard to all of the files of an HTML document of an access destination web page, one or more objects, preferably two objects, applicable attribute information, and a version of the HTML document. Thus, one electronic certificate may be obtained.

Figure 14:
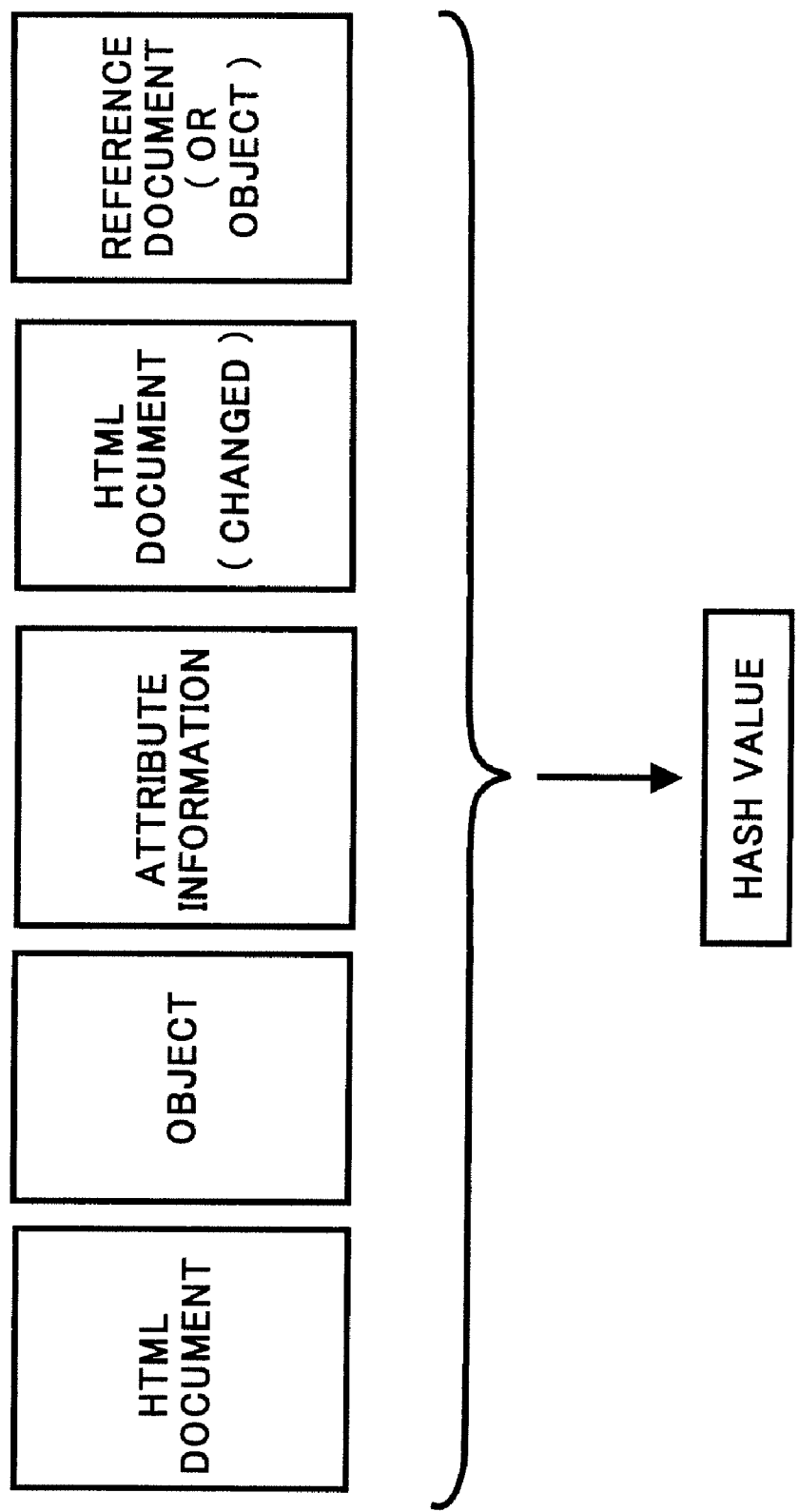
FIG. 14 is a chart illustrating another example of objectives to be calculated into a hash value.

If an object is embedded inline and an external resource is referred to as noted from FIG. 14, totally one hash value can also be generated with regard to all of the files of the HTML document, the object, the applicable attribute information, the version of the HTML document, and the reference destination HTML document or the object. Thus, one electronic certificate can be obtained.

Figure 15:
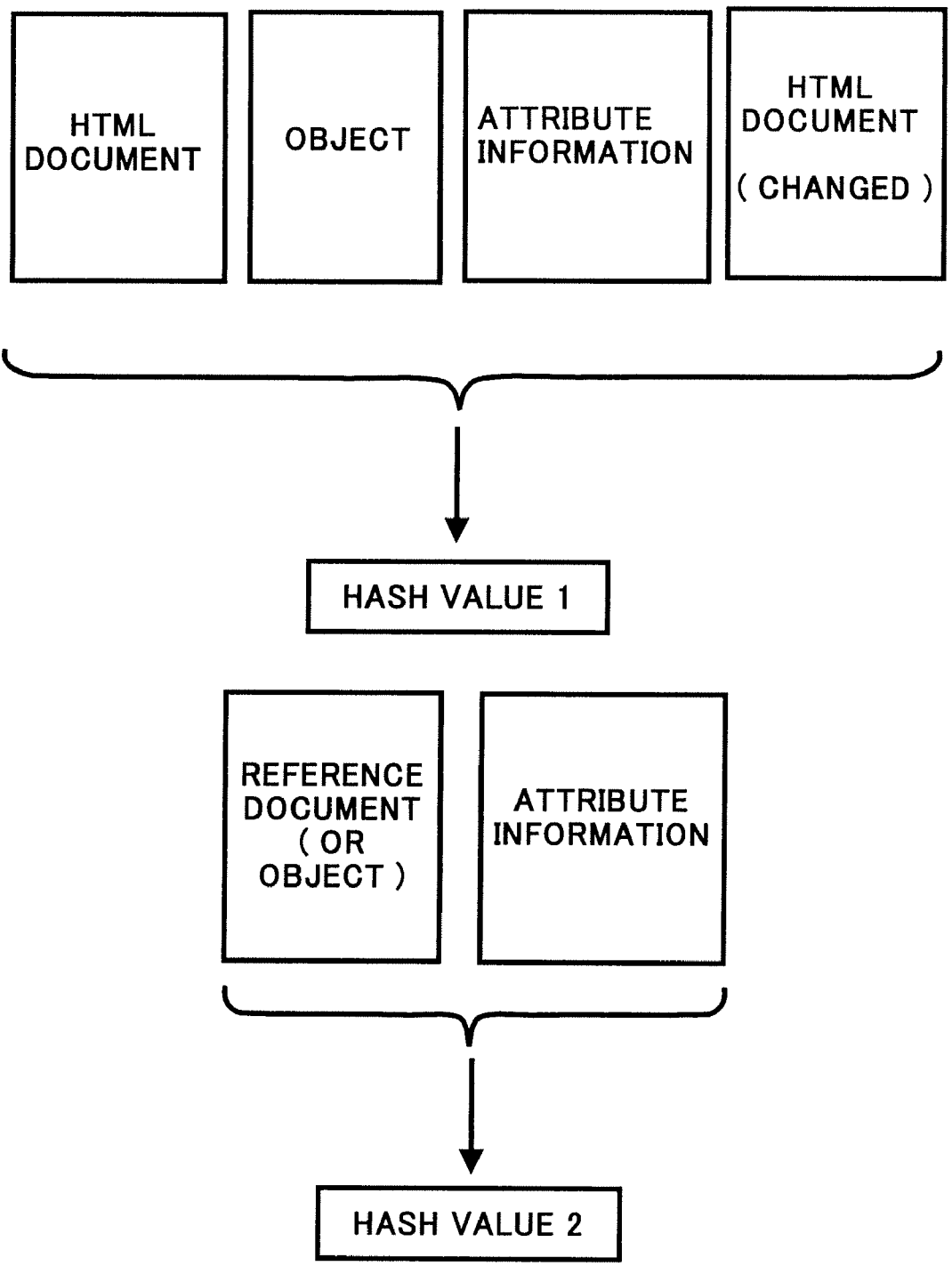
FIG. 15 is a chart illustrating still another example of objectives to be separately calculated into a plurality of hash values.

Further, if an object is embedded inline and an external resource is referred to as illustrated in FIG. 15, a first hash value 1 can be generated with regard to all of the files of the HTML document, the object, the applicable attribute information, and the version of the HTML document. A second hash value 2 can be generated with regard to a file of a reference destination HTML document (or a file of an object) and its applicable attribute information. In such a case, since an electronic certificate with regard to the HTML document of the reference destination web page is independently issued, release of the web page on the network can be separately certified.

Further, only one of the object embedded inline and the web page or the object referred to can be obtained depending on a designation of the requester. Further, a layer below the initially referred web page can also be referred to as the external resource. However, it can also be handled in accordance with a designation of the requester.

If the requester issues none of designations, a prescribed rule can automatically be adopted in such a manner that a first layer below the first layer by one can in principle be obtained. Further, when an object is embedded inline in a reference destination web page, the object can be regarded and handled as is included in the reference destination web page.

Figure 16:
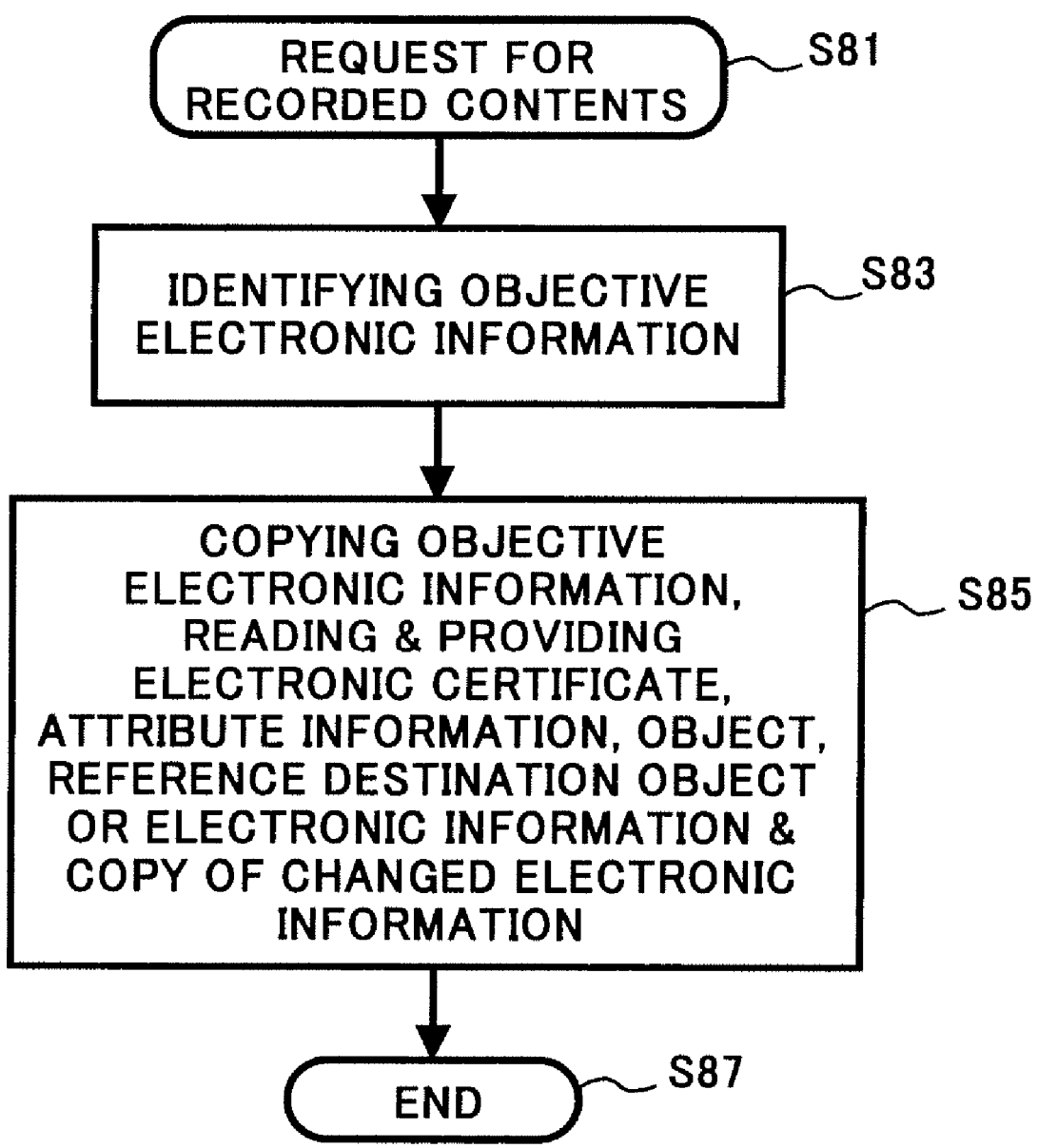
FIG. 16 is a flowchart illustrating a certifying operation practiced in response to a request for recorded contents.

One example of a certificate providing operation performed responsive to a request for recorded contents is now described with reference to FIG. 16.

The certificate providing function 161 may identify a certifying objective electronic information from a request for recorded contents (in step S81). Subsequently, the certificate providing function 161 may read from the memory 61' a copy of objective electronic information, an applicable electronic certificate, attribute information, an object embedded inline, a reference destination object or an electronic information, and a copy of a version of the objective electronic information.

After that, that information may be provided with the CD-R 63 or the like (in step S85). When a request for recorded contents is made as described earlier with reference to the fifth type service, substantially the same operation as illustrated in FIG. 16 may be practiced.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A method for proving that prescribed electronic information stored in a computer connected to a network could be accessed and viewed, said method comprising:
   first obtaining, at a second server, a copy of electronic information from a first source server separate from the second server;
   generating, at the second server, attribute information related to a location of the electronic information based on the copy;
   obtaining, at the second server, an electronic certification specifying a time and day when the copy is obtained;
   second obtaining, at the second server, the copy of the electronic information from a different IP address than in the first obtaining; and
   providing, by the second server, the electronic certification together with the copy of the electronic information and the attribute information upon request.

2. The method according to claim 1, wherein the prescribed electronic information stored in the computer is stored in a database of the computer accessible by the public.

3. The method according to claim 2, wherein the database also stores abstracts of the electronic information.

4. The method according to claim 1, wherein the first obtaining a copy of the electronic information includes:
   displaying one or more links respectively representing the electronic information; and
   allowing access to the electronic information using an applicable link.

5. The method according to claim 1, further comprising:
storing information indicating availability of retrieval for the electronic information via the network in a memory when the electronic information can be retrieved.

6. The method according to claim 1, wherein said network includes an Internet.

7. The method according to claim 1, wherein said electronic information includes a document described by a markup language generating a web page.

8. The method according to claim 1, wherein said attribute information includes at least any one of an electronic information displaying period of time, the access source IP address, and a number of access times.

9. The method according to claim 1, wherein for the electronic information a first hash value is calculated from both of the electronic information and the attribute information, and a second hash value is obtained, and the first hash value and the second hash value are assigned to the electronic certificate as inherent information for the electronic information.

10. The method according to claim 1, wherein said obtaining the electronic information is executed either via the Internet or with a computer readable medium.

11. The method according to claim 1, wherein in the first or second obtaining, at the second server, of the copy of the electronic information, the second server periodically accesses the first server to obtain a copy of the electronic information on each access, and determines whether contents of the copy of the electronic information, during a current access, are different from contents of the copy of the electronic information during a prior access, and when different the copy of the current electronic information during the current access is stored with new attribute information and a new electronic certificate.

12. A system for proving that prescribed electronic information stored in a computer connected to a network could be accessed and viewed, said system comprising:
a second server configured to:
first obtain a copy of electronic information from a first source server separate from the second server;
generate attribute information related to a location of the electronic information based on the copy;
obtain an electronic certification specifying a time and day when the copy is obtained;
second obtain the copy of the electronic information from a different IP address than in the first obtaining; and
provide the electronic certification together with the copy of the electronic information and the attribute information upon request.

* * * * *